US011132065B2

(12) United States Patent
Gillian et al.

(10) Patent No.: US 11,132,065 B2
(45) Date of Patent: Sep. 28, 2021

(54) RADAR-ENABLED SENSOR FUSION

(71) Applicant: Google LLC, Mountain View, CA (US)

(72) Inventors: Nicholas Edward Gillian, Palo Alto, CA (US); Carsten C. Schwesig, San Francisco, CA (US); Jaime Lien, Mountain View, CA (US); Patrick M. Amihood, San Francisco, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/503,234

(22) Filed: Jul. 3, 2019

(65) Prior Publication Data

US 2019/0321719 A1    Oct. 24, 2019

Related U.S. Application Data

(63) Continuation of application No. 15/286,512, filed on Oct. 5, 2016, now Pat. No. 10,401,490.

(Continued)

(51) Int. Cl.
*G06F 3/01* (2006.01)
*G01S 7/41* (2006.01)
(Continued)

(52) U.S. Cl.
CPC ............. *G06F 3/017* (2013.01); *A63F 13/21* (2014.09); *A63F 13/24* (2014.09); *G01S 7/4004* (2013.01);
(Continued)

(58) Field of Classification Search
CPC .. G06K 9/00201; G06K 9/6288; G06K 9/629; G06F 3/017; G06F 3/011;
(Continued)

(56) References Cited

U.S. PATENT DOCUMENTS 3,610,874 A    10/1971    Gagliano
3,752,017 A    8/1973    Lloyd et al.
(Continued)

FOREIGN PATENT DOCUMENTS

CN    1299501    6/2001
CN    1462382    12/2003
(Continued)

OTHER PUBLICATIONS

Advisory Action, U.S. Appl. No. 14/504,139, 3 pages, Aug. 28, 2017.

(Continued)

*Primary Examiner* — Olumide Ajibade Akonai
(74) *Attorney, Agent, or Firm* — Colby Nipper PLLC

(57) ABSTRACT

This document describes apparatuses and techniques for radar-enabled sensor fusion. In some aspects, a radar field is provided and reflection signals that correspond to a target in the radar field are received. The reflection signals are transformed to provide radar data, from which a radar feature indicating a physical characteristic of the target is extracted. Based on the radar features, a sensor is activated to provide supplemental sensor data associated with the physical characteristic. The radar feature is then augmented with the supplemental sensor data to enhance the radar feature, such as by increasing an accuracy or resolution of the radar feature. By so doing, performance of sensor-based applications, which rely on the enhanced radar features, can be improved.

20 Claims, 16 Drawing Sheets

Related U.S. Application Data

(60) Provisional application No. 62/237,975, filed on Oct. 6, 2015.

(51) Int. Cl.

| | | |
|---|---|---|
| *G01S 13/56* | (2006.01) | |
| *G01S 13/86* | (2006.01) | |
| *H04Q 9/00* | (2006.01) | |
| *G06K 9/00* | (2006.01) | |
| *G06K 9/62* | (2006.01) | |
| *G01S 13/88* | (2006.01) | |
| *G06F 21/32* | (2013.01) | |
| *G06F 3/0481* | (2013.01) | |
| *G01S 7/40* | (2006.01) | |
| *H04W 4/80* | (2018.01) | |
| *G06N 20/00* | (2019.01) | |
| *H04W 16/28* | (2009.01) | |
| *G01S 13/90* | (2006.01) | |
| *G06F 16/245* | (2019.01) | |
| *G06F 21/62* | (2013.01) | |
| *A63F 13/21* | (2014.01) | |
| *A63F 13/24* | (2014.01) | |
| *G01S 13/66* | (2006.01) | |
| *G08C 17/02* | (2006.01) | |
| *G06T 7/73* | (2017.01) | |
| *G01S 13/931* | (2020.01) | |
| *G06F 1/16* | (2006.01) | |
| *G06F 3/0484* | (2013.01) | |
| *G01S 19/42* | (2010.01) | |
| *G06F 3/0346* | (2013.01) | |
| *G06F 3/16* | (2006.01) | |

(52) U.S. Cl.
CPC .............. *G01S 7/41* (2013.01); *G01S 7/412* (2013.01); *G01S 7/415* (2013.01); *G01S 13/56* (2013.01); *G01S 13/66* (2013.01); *G01S 13/86* (2013.01); *G01S 13/867* (2013.01); *G01S 13/88* (2013.01); *G01S 13/888* (2013.01); *G01S 13/90* (2013.01); *G01S 13/904* (2019.05); *G06F 3/011* (2013.01); *G06F 3/04815* (2013.01); *G06F 16/245* (2019.01); *G06F 21/32* (2013.01); *G06F 21/6245* (2013.01); *G06K 9/00201* (2013.01); *G06K 9/629* (2013.01); *G06K 9/6288* (2013.01); *G06N 20/00* (2019.01); *H04Q 9/00* (2013.01); *H04W 4/80* (2018.02); *H04W 16/28* (2013.01); *A63F 2300/8082* (2013.01); *G01S 13/865* (2013.01); *G01S 13/931* (2013.01); *G01S 19/42* (2013.01); *G01S 2013/9322* (2020.01); *G06F 1/163* (2013.01); *G06F 3/0346* (2013.01); *G06F 3/0484* (2013.01); *G06F 3/165* (2013.01); *G06F 2203/0384* (2013.01); *G06F 2221/2105* (2013.01); *G06T 7/75* (2017.01); *G08C 17/02* (2013.01); *G08C 2201/93* (2013.01); *H04Q 2209/883* (2013.01)

(58) Field of Classification Search
CPC .. G06F 3/04883; G01S 13/931; G01S 13/867; G01S 17/936; G01S 2013/9375; G01S 13/86; G01S 15/931; G01S 13/862; G01S 13/865; G01S 13/42; G01S 13/87; G01S 2013/9364; G01S 2013/9367; G01S 7/41; G01S 7/415; G01S 13/56; B60W 2550/308; B60W 2420/52; G01C 21/165
See application file for complete search history.

(56) References Cited

U.S. PATENT DOCUMENTS

| | | |
|---|---|---|
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,121,124 A | 6/1992 | Spivey et al. |
| 5,298,715 A | 3/1994 | Chalco et al. |
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,210,771 B1 | 4/2001 | Post et al. |
| 6,254,544 B1 | 7/2001 | Hayashi |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 7,999,722 B2 | 8/2011 | Beeri et al. |

(56) References Cited

U.S. PATENT DOCUMENTS

| | | |
|---|---|---|
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,223,494 B1 | 12/2015 | DeSalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |
| 9,346,167 B2 | 5/2016 | O'Connor et al. |
| 9,354,709 B1 | 5/2016 | Heller et al. |
| 9,508,141 B2 | 11/2016 | Khachaturian et al. |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,034,630 B2 | 7/2018 | Lee et al. |
| 10,063,427 B1 | 8/2018 | Brown |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 * | 9/2019 | Gillian ................ G06F 21/6245 |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev et al. |
| 10,540,001 B1 | 1/2020 | Poupyrev et al. |
| 10,572,027 B2 | 2/2020 | Poupyrev et al. |
| 10,579,150 B2 | 3/2020 | Gu et al. |
| 10,642,367 B2 | 5/2020 | Poupyrev |
| 10,660,379 B2 | 5/2020 | Poupyrev et al. |
| 10,664,059 B2 | 5/2020 | Poupyrev |
| 10,664,061 B2 | 5/2020 | Poupyrev |
| 10,705,185 B1 | 7/2020 | Lien et al. |
| 10,768,712 B2 | 9/2020 | Schwesig et al. |
| 10,817,065 B1 | 10/2020 | Lien et al. |
| 10,817,070 B2 | 10/2020 | Lien et al. |
| 10,823,841 B1 | 11/2020 | Lien et al. |
| 10,908,696 B2 | 2/2021 | Amihood et al. |
| 10,936,081 B2 | 3/2021 | Poupyrev |
| 10,936,085 B2 | 3/2021 | Poupyrev et al. |
| 10,948,996 B2 | 3/2021 | Poupyrev et al. |
| 11,080,556 B1 | 8/2021 | Gillian et al. |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0046736 A1 | 3/2004 | Pryor et al. |
| 2004/0102693 A1 | 5/2004 | Jenkins |
| 2004/0157662 A1 | 8/2004 | Tsuchiya |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodera et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |

(56) References Cited

U.S. PATENT DOCUMENTS

| | | |
|---|---|---|
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder et al. |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0292468 A1* | 11/2009 | Wu .................. G01S 13/867 701/301 |
| 2009/0295712 A1 | 12/2009 | Ritzau |
| 2009/0303100 A1* | 12/2009 | Zemany ............. G01S 13/888 342/28 |
| 2009/0319181 A1 | 12/2009 | Khosravy et al. |
| 2010/0002912 A1 | 1/2010 | Solinsky |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith, Jr. |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0105358 A1 | 5/2012 | Momeyer et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0200600 A1 | 8/2012 | Demaine |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0270564 A1 | 10/2012 | Gum et al. |
| 2012/0276849 A1 | 11/2012 | Hyde et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1* | 2/2013 | Cuddihy .............. G16H 50/30 600/301 |
| 2013/0076649 A1 | 3/2013 | Myers et al. |
| 2013/0076788 A1 | 3/2013 | Ben Zvi |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0106710 A1 | 5/2013 | Ashbrook |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |

(56) References Cited

U.S. PATENT DOCUMENTS

| | | |
|---|---|---|
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0222232 A1 | 8/2013 | Kong et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0260630 A1 | 10/2013 | Ito et al. |
| 2013/0263029 A1 | 10/2013 | Rossi et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0035737 A1 * | 2/2014 | Rashid .................. B60Q 9/008 340/435 |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0149859 A1 | 5/2014 | Van Dyken et al. |
| 2014/0181509 A1 | 6/2014 | Liu |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0084855 A1 | 3/2015 | Song et al. |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177374 A1 | 6/2015 | Driscoll et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346701 A1 | 12/2015 | Gordon et al. |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0370250 A1 | 12/2015 | Bachrach et al. |
| 2015/0375339 A1 | 12/2015 | Sterling et al. |
| 2016/0011668 A1 | 1/2016 | Gilad-Bachrach et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0077202 A1 | 3/2016 | Hirvonen et al. |
| 2016/0085296 A1 | 3/2016 | Mo et al. |
| 2016/0090839 A1 | 3/2016 | Stolarczyk |

(56) References Cited

U.S. PATENT DOCUMENTS

| | | |
|---|---|---|
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0124579 A1 | 5/2016 | Tokutake |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0234365 A1 | 8/2016 | Alameh et al. |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 * | 9/2016 | Molchanov ......... G06K 9/00355 |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0291143 A1 | 10/2016 | Cao et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0011210 A1 | 1/2017 | Cheong et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0168630 A1 | 6/2017 | Khoshkava et al. |
| 2017/0192523 A1 | 7/2017 | Poupyrev |
| 2017/0192629 A1 | 7/2017 | Takada et al. |
| 2017/0196513 A1 | 7/2017 | Longinotti-Buitoni et al. |
| 2017/0224280 A1 | 8/2017 | Bozkurt et al. |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329412 A1 | 11/2017 | Schwesig et al. |
| 2017/0329425 A1 | 11/2017 | Karagozler et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1 | 9/2019 | Gribetz et al. |
| 2019/0391667 A1 | 12/2019 | Poupyrev |
| 2019/0394884 A1 | 12/2019 | Karagozler et al. |
| 2020/0064924 A1 | 2/2020 | Poupyrev et al. |
| 2020/0089314 A1 | 3/2020 | Poupyrev et al. |
| 2020/0150776 A1 | 5/2020 | Poupyrev et al. |
| 2020/0218361 A1 | 7/2020 | Poupyrev |
| 2020/0229515 A1 | 7/2020 | Poupyrev et al. |
| 2020/0278422 A1 | 9/2020 | Lien et al. |
| 2020/0326708 A1 | 10/2020 | Wang et al. |
| 2020/0393912 A1 | 12/2020 | Lien et al. |
| 2020/0409472 A1 | 12/2020 | Lien et al. |
| 2021/0096653 A1 | 4/2021 | Amihood et al. |
| 2021/0132702 A1 | 5/2021 | Poupyrev |

FOREIGN PATENT DOCUMENTS

| | | |
|---|---|---|
| CN | 101349943 | 1/2009 |
| CN | 101636711 | 1/2010 |
| CN | 101751126 | 6/2010 |
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103091667 | 5/2013 |
| CN | 103502911 | 1/2014 |
| CN | 103534664 | 1/2014 |
| CN | 102660988 | 3/2014 |
| CN | 103675868 | 3/2014 |
| CN | 104035552 | 9/2014 |
| CN | 104115118 | 10/2014 |
| CN | 103355860 | 1/2016 |
| CN | 106154270 | 11/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2014165476 | 10/2014 |
| EP | 2953007 | 12/2015 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | H11168268 | 6/1999 |
| JP | 2003500759 | 1/2003 |
| JP | 2003280049 | 10/2003 |
| JP | 2006163886 | 6/2006 |
| JP | 2006234716 | 9/2006 |
| JP | 2007011873 | 1/2007 |
| JP | 2007132768 | 5/2007 |
| JP | 2007266772 | 10/2007 |
| JP | 2007333385 | 12/2007 |
| JP | 2008287714 | 11/2008 |
| JP | 2008293501 | 12/2008 |
| JP | 2009037434 | 2/2009 |
| JP | 2010049583 | 3/2010 |
| JP | 2011003202 | 1/2011 |
| JP | 2011086114 | 4/2011 |
| JP | 2011102457 | 5/2011 |
| JP | 201218583 | 9/2012 |
| JP | 2012198916 | 10/2012 |
| JP | 2013196047 | 9/2013 |

(56) References Cited

FOREIGN PATENT DOCUMENTS

| | | |
|---|---|---|
| JP | 2013251913 | 12/2013 |
| JP | 2014503873 | 2/2014 |
| JP | 2014532332 | 12/2014 |
| JP | 2015507263 | 3/2015 |
| JP | 2015509634 | 3/2015 |
| KR | 1020080102516 | 11/2008 |
| KR | 100987650 | 10/2010 |
| KR | 1020130137005 | 12/2013 |
| KR | 1020140055985 | 5/2014 |
| KR | 101914850 | 10/2018 |
| TW | 201425974 | 7/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005033387 | 4/2005 |
| WO | 2007125298 | 11/2007 |
| WO | 2008061385 | 5/2008 |
| WO | 2009032073 | 3/2009 |
| WO | 2009083467 | 7/2009 |
| WO | 2010032173 | 3/2010 |
| WO | 2010101697 | 9/2010 |
| WO | 2012026013 | 3/2012 |
| WO | 2012064847 | 5/2012 |
| WO | 2013084108 | 6/2013 |
| WO | 2013154864 | 10/2013 |
| WO | 2013186696 | 12/2013 |
| WO | 2013191657 | 12/2013 |
| WO | 2013192166 | 12/2013 |
| WO | 2014019085 | 2/2014 |
| WO | 2014085369 | 5/2014 |
| WO | 2014116968 | 7/2014 |
| WO | 2014124520 | 8/2014 |
| WO | 2014136027 | 9/2014 |
| WO | 2014160893 | 10/2014 |
| WO | 2014165476 | 10/2014 |
| WO | 2014138280 | 12/2014 |
| WO | 2014204323 | 12/2014 |
| WO | 2015017931 | 2/2015 |
| WO | 2015022671 | 2/2015 |
| WO | 2015149049 | 10/2015 |
| WO | 2016053624 | 4/2016 |
| WO | 2016118534 | 7/2016 |
| WO | 2016154560 | 9/2016 |
| WO | 2016154568 | 9/2016 |
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017200571 | 11/2017 |
| WO | 20170200949 | 11/2017 |
| WO | 2018106306 | 6/2018 |

OTHER PUBLICATIONS

Apple Watch Used Four Sensors to Detect your Pulse, retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; The Verge, paragraph 1, 4 pages, Sep. 9, 2014.
Cardiio, Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, 6 pages, Feb. 24, 2015.
Clever Toilet Checks on Your Health, cnn.com; Technology, 2 pages, Jun. 28, 2005.
Combined Search and Examination Report, GB Application No. 1620892.8, 5 pages, Apr. 6, 2017.
Combined Search and Examination Report, GB Application No. 1620891.0, 9 pages, May 31, 2017.
Corrected Notice of Allowance, U.S. Appl. No. 14/930,220, 2 pages, May 11, 2017.
Corrected Notice of Allowance, U.S. Appl. No. 14/930,220, 2 pages, Mar. 20, 2017.
Corrected Notice of Allowance, U.S. Appl. No. 14/582,896, 2 pages, Feb. 6, 2017.
Corrected Notice of Allowance, U.S. Appl. No. 14/582,896, 2 pages, Feb. 23, 2017.
Corrected Notice of Allowance, U.S. Appl. No. 14/312,486, 4 pages, Oct. 28, 2016.
Corrected Notice of Allowance, U.S. Appl. No. 14/582,896, 2 pages, Dec. 19, 2016.
Corrected Notice of Allowance, U.S. Appl. No. 14/504,061, 2 pages, Dec. 27, 2016.
Corrected Notice of Allowance, U.S. Appl. No. 14/312,486, 4 pages, Jan. 23, 2017.
Corrected Notice of Allowance, U.S. Appl. No. 15/362,359, 10 pages, Sep. 17, 2018.
Extended European Search Report, EP Application No. 15170577.9, 12 pages, Nov. 5, 2015.
Extended European Search Report, European Application No. 19158625.4, 16 pages, May 8, 2019.
Final Office Action, U.S. Appl. No. 15/286,537, 21 pages, Apr. 19, 2019.
Final Office Action, U.S. Appl. No. 15/287,253, 10 pages, Apr. 2, 2019.
Final Office Action, U.S. Appl. No. 15/287,155, 11 pages, Apr. 10, 2019.
Final Office Action, U.S. Appl. No. 15/287,308, 23 pages, Feb. 8, 2019.
Final Office Action, U.S. Appl. No. 14/959,901, 18 pages, May 30, 2019.
Final Office Action, U.S. Appl. No. 15/142,471, 26 pages, Jun. 20, 2019.
Final Office Action, U.S. Appl. No. 14/504,061, 10 pages, Mar. 9, 2016.
Final Office Action, U.S. Appl. No. 14/312,486, 32 pages, Jun. 3, 2016.
Final Office Action, U.S. Appl. No. 14/681,625, 10 pages, Dec. 7, 2016.
Final Office Action, U.S. Appl. No. 14/599,954, 23 pages, Aug. 10, 2016.
Final Office Action, U.S. Appl. No. 14/504,038, 23 pages, Sep. 27, 2016.
Final Office Action, U.S. Appl. No. 14/959,799, 12 pages, Jul. 19, 2017.
Final Office Action, U.S. Appl. No. 14/874,955, 9 pages, Jun. 30, 2017.
Final Office Action, U.S. Appl. No. 15/398,147, 11 pages, Jun. 30, 2017.
Final Office Action, U.S. Appl. No. 14/959,901, 19 pages, Aug. 25, 2017.
Final Office Action, U.S. Appl. No. 14/518,863, 18 pages, May 5, 2017.
Final Office Action, U.S. Appl. No. 14/504,121, 16 pages, Aug. 8, 2017.
Final Office Action, U.S. Appl. No. 14/715,454, 14 pages, Sep. 7, 2017.
Final Office Action, U.S. Appl. No. 14/715,793, 7 pages, Sep. 12, 2017.
Final Office Action, U.S. Appl. No. 14/504,121, 23 pages, Jul. 9, 2018.
Final Office Action, U.S. Appl. No. 15/595,649, 13 pages, May 23, 2018.
Final Office Action, U.S. Appl. No. 15/142,689, 16 pages, Jun. 1, 2018.
Final Office Action, U.S. Appl. No. 15/267,181, 31 pages, Jun. 7, 2018.
Final Office Action, U.S. Appl. No. 14/874,955, 9 pages, Jun. 11, 2018.

(56) References Cited

OTHER PUBLICATIONS

Final Office Action, U.S. Appl. No. 14/959,901, 21 pages, Jun. 15, 2018.
Final Office Action, U.S. Appl. No. 15/286,152, 25 pages, Jun. 26, 2018.
Final Office Action, U.S. Appl. No. 15/166,198, 33 pages, Sep. 27, 2018.
Final Office Action, U.S. Appl. No. 14/731,195, 12 pages, Oct. 11, 2018.
Final Office Action, U.S. Appl. No. 14/809,901, 7 pages, Dec. 13, 2018.
Final Office Action, U.S. Appl. No. 15/286,512, 15 pages, Dec. 26, 2018.
Final Office Action, U.S. Appl. No. 15/403,066, 31 pages, Oct. 5, 2017.
Final Office Action, U.S. Appl. No. 14/959,730, 16 pages, Nov. 22, 2017.
Final Office Action, U.S. Appl. No. 14/959,799, 17 pages, Jan. 4, 2018.
Final Office Action, U.S. Appl. No. 14/720,632, 18 pages, Jan. 9, 2018.
Final Office Action, U.S. Appl. No. 15/142,619, 15 pages, Feb. 8, 2018.
Final Office Action, Korean Application No. 10-2016-7036023, 8 pages, Feb. 19, 2018.
Final Office Action, U.S. Appl. No. 15/093,533, 19 pages, Mar. 21, 2018.
Final Office Action, U.S. Appl. No. 14/518,863, 21 pages, Apr. 5, 2018.
Final Office Action, U.S. Appl. No. 14/715,454, 19 pages, Apr. 17, 2018.
Final Office Action, U.S. Appl. No. 14/504,139, 14 pages, May 1, 2018.
Final Office Action, U.S. Appl. No. 14/699,181, 41 pages, May 4, 2018.
First Action Interview OA, U.S. Appl. No. 14/715,793, 3 pages, Jun. 21, 2017.
First Action Interview Office Action, U.S. Appl. No. 14/959,901, 3 pages, Apr. 14, 2017.
First Action Interview Office Action, U.S. Appl. No. 15/286,152, 5 pages, Mar. 1, 2018.
First Action Interview Office Action, U.S. Appl. No. 14/731,195, 4 pages, Jun. 21, 2018.
First Action Interview Office Action, U.S. Appl. No. 15/166,198, 8 pages, Apr. 25, 2018.
First Action Interview Office Action, U.S. Appl. No. 15/917,238, 6 pages, Jun. 6, 2019.
First Action Interview Office Action, U.S. Appl. No. 15/142,471, 29 pages, Feb. 5, 2019.
First Action Interview Pilot Program Pre-Interview Communication, U.S. Appl. No. 14/731,195, 3 pages, Aug. 1, 2017.
First Exam Report, EP Application No. 15754352.1, 7 pages, Mar. 5, 2018.
First Examination Report, GB Application No. 1621332.4, 7 pages, May 16, 2017.
Foreign Office Action, KR Application No. 10-2016-7035397, 5 pages, Sep. 20, 2017.
Foreign Office Action, KR Application No. 10-2016-7032967, 4 pages, Sep. 14, 2017.
Foreign Office Action, JP Application No. 2016-563979, 15 pages, Sep. 21, 2017.
Foreign Office Action, JP Application No. 2016567813, 8 pages, Sep. 22, 2017.
Foreign Office Action, JP App. No. 2016-567813, 3 pages, Jan. 16, 2018.
Foreign Office Action, Korean Application No. 10-2016-7036396, 7 pages, Jan. 3, 2018.
Foreign Office Action, Japanese Application No. 2016-575564, 5 pages, Dec. 5, 2017.
Foreign Office Action, Korean Application No. 10-2016-7036023, 4 pages, Apr. 12, 2018.
Foreign Office Action, Japanese Application No. 2016-563979, 5 pages, Feb. 7, 2018.
Foreign Office Action, Japanese Application No. 2016-567839, 3 pages, Apr. 3, 2018.
Foreign Office Action, EP Application No. 15754323.2, 8 pages, Mar. 9, 2018.
Foreign Office Action, Chinese Application No. 201721290290.3, 2 pages, Mar. 9, 2018.
Foreign Office Action, European Application No. 16784352.3, 3 pages, May 16, 2018.
Foreign Office Action, Japanese Application No. 2016-563979, 3 pages, May 21, 2018.
Foreign Office Action, Korean Application No. 1020187012629, 6 pages, May 24, 2018.
Foreign Office Action, Chinese Application No. 201721290290.3, 3 pages, Jun. 6, 2018.
Foreign Office Action, Chinese Application No. 201580036075.8, 14 page, Jul. 4, 2018.
Foreign Office Action, Japanese Application No. 2016-575564, 4 pages, Jul. 10, 2018.
Foreign Office Action, CN Application No. 201580034908.7, 17 pages, Jul. 3, 2018.
Foreign Office Action, Japanese Application No. 2018-501256, 11 pages, Jul. 24, 2018.
Foreign Office Action, Chinese Application No. 201510300495.4, 18 pages, Jun. 21, 2018.
Foreign Office Action, UK Application No. 1620891.0, 5 pages, Dec. 6, 2018.
Foreign Office Action, European Application No. 16725269.1, 14 pages, Nov. 26, 2018.
Foreign Office Action, Korean Application No. 1020187029464, 1 page, Oct. 30, 2018.
Foreign Office Action, European Application No. 15754352.1, 5 pages, Nov. 7, 2018.
Foreign Office Action, Korean Application No. 10-2017-7027877, 5 pages, Nov. 23, 2018.
Foreign Office Action, Korean Application No. 10-2017-7027871, 6 pages, Nov. 23, 2018.
Foreign Office Action, European Application No. 16724775.8, 9 pages, Nov. 23, 2018.
Foreign Office Action, Japanese Application No. 2017-541972, 5 pages, Nov. 27, 2018.
Foreign Office Action, Japanese Application No. 1020187027694, 15 pages, Nov. 23, 2018.
Foreign Office Action, Chinese Application No. 201580034536.8, Oct. 9, 2018.
Foreign Office Action, Korean Application No. 10-2016-7036015, 3 pages, Oct. 15, 2018.
Foreign Office Action, KR Application No. 10-2016-7036023, 10 pages, Aug. 11, 2017.
Foreign Office Action, EP Application No. 15170577.9, 7 pages, May 30, 2017.
Foreign Office Action, Japanese Application No. 2018021296, 8 pages, Dec. 25, 2018.
Foreign Office Action, European Application No. 15170577.9, 31 pages, Dec. 21, 2018.
Foreign Office Action, Japanese Application No. 2016-575564, 4 pages, Jan. 10, 2019.
Foreign Office Action, Chinese Application No. 201580036075.8, 5 pages, Feb. 19, 2019.
Foreign Office Action, Chinese Application No. 201580034908.7, 10 pages, Feb. 19, 2019.
Foreign Office Action, Chinese Application No. 201580035246.5, 22 pages, Jan. 31, 2019.
Foreign Office Action, Japanese Application No. 2018501256, 3 pages, Feb. 26, 2019.
Foreign Office Action, European Application No. 16716351.8, 7 pages, Mar. 15, 2019.
Foreign Office Action, Japanese Application No. 2018-021296, 3 pages, Apr. 9, 2019.

(56) References Cited

OTHER PUBLICATIONS

Foreign Office Action, Chinese Application No. 201510300495.4, 6 pages, Apr. 10, 2019.
Foreign Office Action, Korean Application No. 1020197004803, 6 pages, Apr. 26, 2019.
Foreign Office Action, Japanese Application No. 2018156138, 3 pages, May 22, 2019.
Frogpad Introduces Wearable Fabric Keyboard with Bluetooth Technology, Retrieved From: <http://www.geekzone.co.nz/content.asp?contentid=3898> Mar. 16, 2015, 2 pages, Jan. 7, 2005.
International Preliminary Report on Patentability, Application No. PCT/US2015/050903, 12 pages, Apr. 13, 2017.
International Preliminary Report on Patentability, Application No. PCT/US2015/044774, 8 pages, Mar. 2, 2017.
International Preliminary Report on Patentability, Application No. PCT/US2015/030388, 12 pages, Dec. 15, 2016.
International Preliminary Report on Patentability, Application No. PCT/US2015/043963, 12 pages, Feb. 16, 2017.
International Preliminary Report on Patentability, Application No. PCT/US2015/043949, 13 pages, Feb. 16, 2017.
International Preliminary Report on Patentability, PCT Application No. PCT/US2016/063874, 12 pages, Nov. 29, 2018.
International Preliminary Report on Patentability, PCT Application No. PCT/US2017/032733, 7 pages, Nov. 29, 2018.
International Preliminary Report on Patentability, PCT Application No. PCT/US2016/026756, 8 pages, Oct. 19, 2017.
International Preliminary Report on Patentability, PCT Application No. PCT/US2017/051663, 10 pages, Jun. 20, 2019.
International Search Report and Written Opinion, PCT Application No. PCT/US2016/065295, 12 pages, Mar. 14, 2017.
International Search Report and Written Opinion, PCT/US2017/047691, 13 pages, Nov. 16, 2017.
International Search Report and Written Opinion, PCT Application No. PCT/US2017/051663, 16 pages, Nov. 29, 2017.
International Search Report and Written Opinion, Application No. PCT/US2016/055671, 14 pages, Dec. 1, 2016.
International Search Report and Written Opinion, Application No. PCT/US2016/062082, 12 pages, Feb. 23, 2017.
International Search Report and Written Opinion, Application No. PCT/US2016/063874, 19 pages, May 11, 2017.
International Search Report and Written Opinion, Application No. PCT/US2016/060399, 11 pages, Jan. 30, 2017.
International Search Report and Written Opinion, Application No. PCT/US2015/044774, 12 pages, Nov. 3, 2015.
International Search Report and Written Opinion, Application No. PCT/US2015/050903, 18 pages, Feb. 19, 2016.
International Search Report and Written Opinion, Application No. PCT/US2015/043963, 16 pages, Nov. 24, 2015.
International Search Report and Written Opinion, Application No. PCT/US2015/043949, 18 pages, Dec. 1, 2015.
International Search Report and Written Opinion, Application No. PCT/US2016/024267, 13 pages, Jun. 20, 2016.
International Search Report and Written Opinion, Application No. PCT/US2016/024273, 13 pages, Jun. 20, 2016.
International Search Report and Written Opinion, Application No. PCT/US2016/029820, 14 pages, Jul. 15, 2016.
International Search Report and Written Opinion, Application No. PCT/US2016/030177, 15 pages, Aug. 2, 2016.
International Search Report and Written Opinion, Application No. PCT/US2016/030115, 18 pages, Aug. 8, 2016.
International Search Report and Written Opinion, Application No. PCT/US2016/032307, 13 pages, Aug. 25, 2016.
International Search Report and Written Opinion, Application No. PCT/US2016/024289, 17 pages, Aug. 25, 2016.
International Search Report and Written Opinion, Application No. PCT/US2016/034366, 13 pages, Nov. 17, 2016.
International Search Report and Written Opinion, Application No. PCT/US2016/033342, 20 pages, Oct. 27, 2016.
International Search Report and Written Opinion, Application No. PCT/US2016/042013, 12 pages, Oct. 26, 2016.
Life:X Lifestyle eXplorer, Retrieved from <https://web.archive.org/web/20150318093841/http://research.microsoft.com/en-us/projects/lifex>, 2 pages, Feb. 3, 2017.
Non-Final Office Action, U.S. Appl. No. 14/666,155, 12 pages, Feb. 3, 2017.
Non-Final Office Action, U.S. Appl. No. 14/874,955, 8 pages, Feb. 27, 2017.
Non-Final Office Action, U.S. Appl. No. 14/681,625, 7 pages, Mar. 6, 2017.
Non-Final Office Action, U.S. Appl. No. 15/398,147, 10 pages, Mar. 9, 2017.
Non-Final Office Action, U.S. Appl. No. 14/513,875, 9 pages, Feb. 21, 2017.
Non-Final Office Action, U.S. Appl. No. 15/403,066, 31 pages, May 4, 2017.
Non-Final Office Action, U.S. Appl. No. 14/504,038, 33 pages, Mar. 22, 2017.
Non-Final Office Action, U.S. Appl. No. 14/959,799, 16 pages, Sep. 8, 2017.
Non-Final Office Action, U.S. Appl. No. 15/398,147, 7 pages, Sep. 8, 2017.
Non-Final Office Action, U.S. Appl. No. 14/518,863, 20 pages, Sep. 29, 2017.
Non-Final Office Action, U.S. Appl. No. 15/142,689, 18 pages, Oct. 4, 2017.
Non-Final Office Action, U.S. Appl. No. 14/862,409, 15 pages, Jun. 22, 2017.
Non-Final Office Action, U.S. Appl. No. 14/959,730, 14 pages, Jun. 23, 2017.
Non-Final Office Action, U.S. Appl. No. 15/142,619, 16 pages, Aug. 25, 2017.
Non-Final Office Action, U.S. Appl. No. 15/093,533, 18 pages, Aug. 24, 2017.
Non-Final Office Action, U.S. Appl. No. 14/720,632, 16 pages, Jun. 14, 2017.
Non-Final Office Action, U.S. Appl. No. 14/504,121, 13 pages, Jan. 9, 2017.
Non-Final Office Action, U.S. Appl. No. 14/599,954, 16 pages, Jan. 26, 2017.
Non-Final Office Action, U.S. Appl. No. 14/504,139, 10 pages, Jan. 27, 2017.
Non-Final Office Action, U.S. Appl. No. 14/959,799, 10 pages, Jan. 27, 2017.
Non-Final Office Action, U.S. Appl. No. 14/666,155, 9 pages, Aug. 24, 2016.
Non-Final Office Action, U.S. Appl. No. 14/681,625, 9 pages, Aug. 12, 2016.
Non-Final Office Action, U.S. Appl. No. 14/518,863, 16 pages, Oct. 14, 2016.
Non-Final Office Action, U.S. Appl. No. 14/930,220, 15 pages, Sep. 14, 2016.
Non-Final Office Action, U.S. Appl. No. 14/582,896, 9 pages, Jun. 29, 2016.
Non-Final Office Action, U.S. Appl. No. 14/599,954, 17 pages, Feb. 2, 2016.
Non-Final Office Action, U.S. Appl. No. 14/504,038, 22 pages, Feb. 26, 2016.
Non-Final Office Action, U.S. Appl. No. 14/312,486, 25 pages, Oct. 23, 2015.
Non-Final Office Action, U.S. Appl. No. 14/504,061, 8 pages, Nov. 4, 2015.
Non-Final Office Action, U.S. Appl. No. 14/862,409, 17 pages, Dec. 14, 2017.
Non-Final Office Action, U.S. Appl. No. 14/715,454, 16 pages, Jan. 11, 2018.
Non-Final Office Action, U.S. Appl. No. 14/959,901, 21 pages, Jan. 8, 2018.
Non-Final Office Action, U.S. Appl. No. 15/595,649, 16 pages, Oct. 31, 2017.
Non-Final Office Action, U.S. Appl. No. 14/504,139, 12 pages, Oct. 18, 2017.
Non-Final Office Action, U.S. Appl. No. 14/699,181, 33 pages, Oct. 18, 2017.

(56) References Cited

OTHER PUBLICATIONS

Non-Final Office Action, U.S. Appl. No. 15/287,253, 17 pages, Apr. 5, 2018.
Non-Final Office Action, U.S. Appl. No. 15/267,181, 29 pages, Feb. 8, 2018.
Non-Final Office Action, U.S. Appl. No. 14/504,121, 19 pages, Jan. 2, 2018.
Non-Final Office Action, U.S. Appl. No. 14/874,955, 7 pages, Feb. 8, 2018.
Non-Final Office Action, U.S. Appl. No. 15/287,155, 12 pages, Dec. 10, 2018.
Non-Final Office Action, U.S. Appl. No. 15/286,152, 27 pages, Oct. 19, 2018.
Non-Final Office Action, U.S. Appl. No. 15/286,537, 18 pages, Nov. 19, 2018.
Non-Final Office Action, U.S. Appl. No. 15/286,837, 10 pages, Oct. 26, 2018.
Non-Final Office Action, U.S. Appl. No. 14/959,901, 22 pages, Oct. 11, 2018.
Non-Final Office Action, U.S. Appl. No. 15/287,308, 18 pages, Oct. 15, 2018.
Non-Final Office Action, U.S. Appl. No. 14/504,139, 16 pages, Oct. 5, 2018.
Non-Final Office Action, U.S. Appl. No. 15/142,829, 15 pages, Aug. 16, 2018.
Non-Final Office Action, U.S. Appl. No. 15/287,253, 20 pages, Sep. 7, 2018.
Non-Final Office Action, U.S. Appl. No. 15/286,512, 15 pages, Jul. 19, 2018.
Non-Final Office Action, U.S. Appl. No. 15/586,174, 7 pages, Jun. 18, 2018.
Non-Final Office Action, U.S. Appl. No. 14/809,901, 13 pages, May 24, 2018.
Non-Final Office Action, U.S. Appl. No. 14/720,632, 20 pages, May 18, 2018.
Non-Final Office Action, U.S. Appl. No. 15/424,263, 12 pages, May 23, 2019.
Non-Final Office Action, U.S. Appl. No. 15/462,957, 14 pages, May 24, 2019.
Non-Final Office Action, U.S. Appl. No. 16/238,464, 15 pages, Mar. 7, 2019.
Non-Final Office Action, U.S. Appl. No. 15/287,394, 39 pages, Mar. 22, 2019.
Non-Final Office Action, U.S. Appl. No. 15/166,198, 48 pages, Feb. 21, 2019.
Non-Final Office Action, U.S. Appl. No. 15/596,702, 10 pages, Jan. 4, 2019.
Non-Invasive Quantification of Peripheral Arterial Volume Distensibilitiy and its Non-Lineaer Relationship with Arterial Pressure, Journal of Biomechanics, Pergamon Press, vol. 42, No. 8; as cited in the search report for PCT/US2016/013968 citing the whole document, but in particular the abstract, 2 pages, May 29, 2009.
Notice of Allowance, U.S. Appl. No. 14/666,155, 7 pages, Jul. 10, 2017.
Notice of Allowance, U.S. Appl. No. 14/513,875, 7 pages, Jun. 28, 2017.
Notice of Allowance, U.S. Appl. No. 14/504,038, 17 pages, Aug. 7, 2017.
Notice of Allowance, U.S. Appl. No. 15/343,067, 9 pages, Jul. 27, 2017.
Notice of Allowance, U.S. Appl. No. 14/494,863, 7 pages, May 30, 2017.
Notice of Allowance, U.S. Appl. No. 14/681,625, 7 pages, Jun. 7, 2017.
Notice of Allowance, U.S. Appl. No. 14/599,954, 11 pages, May 24, 2017.
Notice of Allowance, U.S. Appl. No. 14/504,061, 7 pages, Sep. 12, 2016.
Notice of Allowance, U.S. Appl. No. 14/312,486, 15 pages, Oct. 7, 2016.
Notice of Allowance, U.S. Appl. No. 14/930,220, 8 pages, Feb. 2, 2017.
Notice of Allowance, U.S. Appl. No. 14/582,896, 5 pages, Nov. 7, 2016.
Notice of Allowance, U.S. Appl. No. 14/862,409, 7 pages, Jun. 6, 2018.
Notice of Allowance, U.S. Appl. No. 14/715,793, 5 pages, Jul. 6, 2018.
Notice of Allowance, U.S. Appl. No. 15/586,174, 5 pages, Sep. 24, 2018.
Notice of Allowance, U.S. Appl. No. 15/362,359, 8 pages, Aug. 3, 2018.
Notice of Allowance, U.S. Appl. No. 15/142,619, 9 pages, Aug. 13, 2018.
Notice of Allowance, U.S. Appl. No. 15/595,649, 8 pages, Sep. 14, 2018.
Notice of Allowance, U.S. Appl. No. 14/874,955, 8 pages, Oct. 4, 2018.
Notice of Allowance, U.S. Appl. No. 15/142,689, 9 pages, Oct. 30, 2018.
Notice of Allowance, U.S. Appl. No. 15/287,200, 19 pages, Nov. 6, 2018.
Notice of Allowance, U.S. Appl. No. 15/595,649, 5 pages, Jan. 3, 2019.
Notice of Allowance, U.S. Appl. No. 14/959,730, 8 pages, Feb. 22, 2018.
Notice of Allowance, U.S. Appl. No. 14/666,155, 5 pages, Feb. 20, 2018.
Notice of Allowance, U.S. Appl. No. 14/874,955, 7 pages, Oct. 20, 2017.
Notice of Allowance, U.S. Appl. No. 14/681,625, 8 pages, Oct. 23, 2017.
Notice of Allowance, U.S. Appl. No. 15/398,147, 8 pages, Nov. 15, 2017.
Notice of Allowance, U.S. Appl. No. 15/403,066, 18 pages, Jan. 8, 2018.
Notice of Allowance, U.S. Appl. No. 14/715,793, 5 pages, Dec. 18, 2017.
Notice of Allowance, U.S. Appl. No. 15/286,495, 5 pages, Jan. 17, 2019.
Notice of Allowance, U.S. Appl. No. 14/504,137, 9 pages, Feb. 6, 2019.
Notice of Allowance, U.S. Appl. No. 15/142,829, 8 pages, Feb. 6, 2019.
Notice of Allowance, U.S. Appl. No. 15/286,152, 23 pages, Mar. 5, 2019.
Notice of Allowance, U.S. Appl. No. 15/286,837, 7 pages, Mar. 6, 2019.
Notice of Allowance, U.S. Appl. No. 15/703,511, 5 pages, Apr. 16, 2019.
Notice of Allowance, U.S. Appl. No. 15/286,512, 14 pages, Apr. 9, 2019.
Notice of Allowance, U.S. Appl. No. 14/731,195, 7 pages, Apr. 24, 2019.
Notice of Allowance, U.S. Appl. No. 15/352,194, 8 pages, Jun. 26, 2019.
Philips Vital Signs Camera, Retrieved From: <http://www.vitalsignscamera.com/> Apr. 15, 2015, 2 pages, Jul. 17, 2013.
Pre-Interview Communication, U.S. Appl. No. 14/494,863, 5 pages, Jan. 27, 2017.
Pre-Interview Communication, U.S. Appl. No. 14/513,875, 3 pages, Oct. 21, 2016.
Pre-Interview Communication, U.S. Appl. No. 14/715,454, 3 pages, Apr. 14, 2017.
Pre-Interview Communication, U.S. Appl. No. 15/343,067, 3 pages, Apr. 19, 2017.
Pre-Interview Communication, U.S. Appl. No. 14/715,793, 3 pages, Mar. 20, 2017.
Pre-Interview Communication, U.S. Appl. No. 14/959,901, 3 pages, Feb. 10, 2017.
Pre-Interview Communication, U.S. Appl. No. 14/959,730, 3 pages, Feb. 15, 2017.

(56) References Cited

OTHER PUBLICATIONS

Pre-Interview Communication, U.S. Appl. No. 15/166,198, 8 pages, Mar. 8, 2018.
Pre-Interview Communication, U.S. Appl. No. 15/142,471, 3 pages, Dec. 12, 2018.
Pre-Interview Communication, U.S. Appl. No. 15/286,495, 4 pages, Sep. 10, 2018.
Pre-Interview Communication, U.S. Appl. No. 15/287,359, 2 pages, Jul. 24, 2018.
Pre-Interview Communication, U.S. Appl. No. 15/362,359, 4 pages, May 17, 2018.
Pre-Interview Communication, U.S. Appl. No. 15/917,238, 6 pages, May 1, 2019.
Pre-Interview Communication, U.S. Appl. No. 15/703,511, 5 pages, Feb. 11, 2019.
Pre-Interview First Office Action, U.S. Appl. No. 15/286,152, 4 pages, Feb. 8, 2018.
Pre-Interview Office Action, U.S. Appl. No. 14/731,195, 4 pages, Dec. 20, 2017.
Pre-Interview Office Action, U.S. Appl. No. 14/862,409, 16 pages, Sep. 15, 2017.
Preliminary Report on Patentability, PCT Application No. PCT/US2016/032307, 9 pages, Dec. 7, 2017.
Preliminary Report on Patentability, PCT Application No. PCT/US2016/034366, 10 pages, Dec. 7, 2017.
Preliminary Report on Patentability, PCT Application No. PCT/US2016/030115, 15 pages, Oct. 31, 2017.
Preliminary Report on Patentability, PCT Application No. PCT/US2016/030177, 11 pages, Oct. 31, 2017.
Preliminary Report on Patentability, PCT Application No. PCT/US2016/030185, 16 pages, Nov. 9, 2017.
Preliminary Report on Patentability, PCT Application No. PCT/US2016/042013, 7 pages, Jan. 30, 2018.
Preliminary Report on Patentability, PCT Application No. PCT/US2016/055671, 9 pages, Apr. 10, 2018.
Preliminary Report on Patentability, PCT Application No. PCT/US2016/065295, 18 pages, Jul. 24, 2018.
Preliminary Report on Patentability, PCT Application No. PCT/US2016/062082, 8 pages, Nov. 15, 2018.
Pressure-Volume Loop Analysis in Cardiology, retrieved from https://en.wikipedia.org/w/index.php?title=Pressure-volume-loop analysis in card iology&oldid=636928657 on Sep. 23, 2017; Obtained per link provided in search report from PCT/US2016/01398 dated Jul. 28, 2016, 10 pages, Dec. 6, 2014.
Restriction Requirement, U.S. Appl. No. 15/362,359, 5 pages, Jan. 8, 2018.
Restriction Requirement, U.S. Appl. No. 15/462,957, 6 pages, Jan. 4, 2019.
Restriction Requirement, U.S. Appl. No. 15/286,537, 8 pages, Aug. 27, 2018.
Restriction Requirement, U.S. Appl. No. 14/666,155, 5 pages, Jul. 22, 2016.
Restriction Requirement, U.S. Appl. No. 15/352,194, 8 pages, Feb. 6, 2019.
Textile Wire Brochure, Retrieved at: http://www.textile-wire.ch/en/home.html, 17 pages, Aug. 7, 2004.
The Dash smart earbuds play back music, and monitor your workout, Retrieved from < http://newatlas.com/bragi-dash-tracking-earbuds/30808/>, 3 pages, Feb. 13, 2014.
The Instant Blood Pressure app estimates blood pressure with your smartphone and our algorithm, Retrieved at: http://www.instantbloodpressure.com/—on Jun. 23, 2016, 6 pages.
Thermofocus No Touch Forehead Thermometer, Technimed, Internet Archive. Dec. 24, 2014. https://web.archive.org/web/20141224070848/http://www.tecnimed.it:80/thermofocus-forehead-thermometer-H1N1-swine-flu.html, 4 pages, Dec. 24, 2018.
Written Opinion, PCT Application No. PCT/US2016/065295, 8 paages, Apr. 13, 2018.
Written Opinion, PCT Application No. PCT/US2017/032733, 5 pages, Jul. 24, 2017.
Written Opinion, PCT Application No. PCT/US2017/051663, 8 pages, Oct. 12, 2018.
Written Opinion, PCT Application PCT/US2016/013968, 9 pages, Jul. 28, 2016.
Written Opinion, PCT Application No. PCT/US2016/060399, 6 pages, May 11, 2017.
Written Opinion, PCT Application No. PCT/US2016/055671, 8 pages, Apr. 13, 2017.
Written Opinion, PCT Application No. PCT/US2017/032733, 5 pages, Jul. 26, 2017.
Written Opinion, PCT Application No. PCT/US2016/026756, 7 pages, Nov. 10, 2016.
Written Opinion, PCT Application No. PCT/US2016/042013, 6 pages, Feb. 2, 2017.
Written Opinion, PCT Application No. PCT/US2016/030177, 9 pages, Nov. 3, 2016.
Written Opinion, PCT Application No. PCT/US2016/030185, 15 pages, Nov. 3, 2016.
Antonimuthu Google's Project Soli brings Gesture Control to Wearables using Radar, YouTube[online], Available from https://www.youtube.com/watch?v=czJfcgvQcNA as accessed on May 9, 2017; See whole video, especially 6:05-6:35.
Arbabian, Amin, et al., A 94GHz mm-Wave to Baseband Pulsed-Radar for Imaging and Gesture Recognition, 2012 IEEE, 2012 Symposium on VLSI Circuits Digest of Technical Papers, 2 pages, Jan. 1, 2012.
Azevedo, Stephen, et al., Micropower Impulse Radar, Science & Technology Review, Feb. 29, 1996, pp. 16-29, 7 pages, Feb. 29, 1996.
Balakrishnan, Guha, et al., Detecting Pulse from Head Motions in Video in Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, 8 pages, Jun. 23, 2013.
Bondade, Rajdeep, et al., A linear-assisted DC-DC hybrid power converter for envelope tracing RF power amplifiers, 2014 IEEE Energy Conversion Congress and Exposition (ECCE), IEEE, Sep. 14, 2014, pp. 5769-5773, XP032680873, DOI: 10.1109/ECCE.2014.6954193, 5 pages, Sep. 14, 2014.
Cheng, Jingyuan, Smart Textiles: From Niche to Mainstream, IEEE Pervasive Computing, pp. 81-84.
Couderc, Jean-Philippe, et al., Detection of Atrial Fibrillation using Contactless Facial Video Monitoring, In Proceedings: Heart Rhythm Society, vol. 12, Issue 1 Available at: <http://www.heartrhythmjournal.com/article/S1547-5271(14)00924-2/pdf>, 7 pages.
Dias, T, et al., Capacitive Fibre-Meshed Transducer for Touch & Proximity Sensing Applications, IEEE Sensors Journal, IEEE Service Center, New York, NY, US, vol. 5, No. 5, Oct. 1, 2005 (Oct. 1, 2005), pp. 989-994, XP011138559, ISSN: 1530-437X, DOI: 10.1109/JSEN.2005.844327, 5 pages, Oct. 1, 2005.
Duncan, David P., Motion Compensation of Synthetic Aperture Radar, Microwave Earth Remote Sensing Laboratory, Brigham Young University, 5 pages, Apr. 15, 2003.
Espina, Javier, et al., Wireless Body Sensor Network for Continuous Cuff-less Blood Pressure Monitoring, International Summer School on Medical Devices and Biosensors, 2006, 5 pages.
Fan, Tenglong, et al., Wireless Hand Gesture Recognition Based on Continuous-Wave Doppler Radar Sensors, IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, 9 pages, Nov. 1, 2016.
Farringdon, Jonny, et al., Wearable Sensor Badge & Sensor Jacket for Context Awareness, Third International Symposium on Wearable Computers, 7 pages.
Garmatyuk, Dmitriy S., et al., Ultra-Wideband Continuous-Wave Random Noise Arc-SAR, IEEE Transaction on Geoscience and Remote Sensing, vol. 40, No. 12, Dec. 2002, 10 pages, Dec. 2002.
Geisheimer, Jonathan L., et al., A Continuous-Wave (CW) Radar for Gait Analysis, IEEE 2001, 5 pages, 2001.
Godana, Bruhtesfa E., Human Movement Characterization in Indoor Environment using GNU Radio Based Radar, Retrieved at: http://

(56) References Cited

OTHER PUBLICATIONS repository.tudelft.nl/islandora/object/uuid:414e1868-dd00-4113-9989-4c213f1f7094?collection=education, 100 pages, Nov. 30, 2009.

Gürbüz, Sevgi Z.., et al., Detection and Identification of Human Targets in Radar Data, Proc. SPIE 6567, Signal Processing, Sensor Fusion, and Target Recognition XVI, 656701, 12 pages, May 7, 2007.

He, David Da., A Continuous, Wearable, and Wireless Heart Monitor Using Head Ballistocardiogram (BCG) and Head Electrocardiogram (ECG) with a Nanowatt ECG Heartbeat Detection Circuit, In Proceedings: Thesis, Department of Electrical Engineering and Computer Science, Massachusetts Institute of Technology Available at: <http://dspace.mit.edu/handle/1721.1/79221>, 137 pages.

Holleis, Paul, et al., Evaluating Capacitive Touch Input on Clothes, Proceedings of the 10th International Conference on Human Computer Interaction, 10 pages, Jan. 1, 2008.

Holleis, Paul, et al., Evaluating Capacitive Touch Input on Clothes, Proceedings of the 10th International Conference on Human Computer Interaction With Mobile Devices and Services, Jan. 1, 2008 (Jan. 1, 2008), p. 81, XP055223937, New York, NY, US DOI: 10.1145/1409240.1409250 ISBN: 978-1-59593-952-4, 11 pages, Jan. 1, 2008.

Ishijima, Masa, Unobtrusive Approaches to Monitoring Vital Signs at Home, Medical & Biological Engineering and Computing, Springer, Berlin, DE, vol. 45, No. 11 as cited in search report for PCT/US2016/013968 dated Jul. 28, 2016, 3 pages, Sep. 26, 2007.

Klabunde, Richard E., Ventricular Pressure-Volume Loop Changes in Valve Disease, Retrieved From <https://web.archive.org/web/20101201185256/http://cvphysiology.com/Heart%20Disease/HD009.htm>, 8 pages, Dec. 1, 2010.

Kubota, Yusuke, et al., A Gesture Recognition Approach by using Microwave Doppler Sensors, IPSJ SIG Technical Report, 2009 (6), Information Processing Society of Japan, Apr. 15, 2010, pp. 1-8, 13 pages, Apr. 15, 2010.

Lee, Cullen E., Computing the Apparent Centroid of Radar Targets, Sandia National Laboratories; Presented at the Proceedings of the 1996 IEEE National Radar Conference: Held at the University of Michigan; May 13-16, 1996; retrieved from https://www.osti.gov/scitech/servlets/purl/218705 on Sep. 24, 2017, 21 pages.

Lien, Jaime, et al., Soli: Ubiquitous Gesture Sensing with Millimeter Wave Radar, ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, 19 pages, Jul. 11, 2016.

Martinez-Garcia, Hermino, et al., Four-quadrant linear-assisted DC/DC voltage regulator, Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, 10 pages, Apr. 23, 2016.

Matthews, Robert J., Venous Pulse, Retrieved at: http://www.rjmatthewsmd.com/Definitions/venous_pulse.htm—Nov. 30, 2016, 7 pages, Apr. 13, 2013.

Nakajima, Kazuki, et al., Development of Real-Time Image Sequence Analysis for Evaluating Posture Change and Respiratory Rate of a Subject in Bed, In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, 8 pages.

Narasimhan, Shar, Combining Self- & Mutual-Capacitive Sensing for Distinct User Advantages, Retrieved from the Internet: URL:http://www.designnews.com/author.asp?section_id=1365&doc_id=271356&print=yes [retrieved on Oct. 1, 2015], 5 pages, Jan. 31, 2014.

Otto, Chris, et al., System Architecture of a Wireless Body Area Sensor Network for Ubiquitous Health Monitoring, Journal of Mobile Multimedia; vol. 1, No. 4, 20 pages, Jan. 10, 2006.

Palese, et al., The Effects of Earphones and Music on the Temperature Measured by Infrared Tympanic Thermometer: Preliminary Results, ORL—head and neck nursing: official journal of the Society of Otorhinolaryngology and Head-Neck Nurses 32.2, pp. 8-12, Jan. 1, 2013.

Patel, P C., et al., Applications of Electrically Conductive Yarns in Technical Textiles, International Conference on Power System Technology (POWECON), 6 pages, Oct. 30, 2012.

Poh, Ming-Zher, et al., A Medical Mirror for Non-contact Health Monitoring, In Proceedings: ACM SIGGRAPH Emerging Technologies Available at: <http://affect.media.mit.edu/pdfs/11.Poh-etal-SIGGRAPH.pdf>, 1 page, Jan. 1, 2011.

Poh, Ming-Zher, et al., Non-contact, Automated Cardiac Pulse Measurements Using Video Imaging and Blind Source Separation, In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, 13 pages, May 7, 2010.

Pu, Qifan, et al., Gesture Recognition Using Wireless Signals, pp. 15-18.

Pu, Quifan, et al., Whole-Home Gesture Recognition Using Wireless Signals, MobiCom'13 Proceedings of the 19th annual international conference on Mobile computing & networking, 12 pages, Aug. 27, 2013.

Pu, Qifan, et al., Whole-Home Gesture Recognition Using Wireless Signals, MobiCom'13, Sep. 30-Oct. 4, Miami, FL, USA, 12 pages, 2013.

Pu, Qifan, et al., Whole-Home Gesture Recognition Using Wireless Signals, Proceedings of the 19th annual international conference on Mobile computing & networking (MobiCom'13), US, ACM, Sep. 30, 2013, pp. 27-38, 12 pages, Sep. 30, 2013.

Schneegass, Stefan, et al., Towards a Garment OS: Supporting Application Development for Smart Garments, Wearable Computers, ACM, 6 pages, Sep. 13, 2014.

Skolnik, Merrill I., CW and Frequency-Modulated Radar, In: "Introduction to Radar Systems", Jan. 1, 1981 (Jan. 1, 1981), McGraw Hill, XP055047545, ISBN: 978-0-07-057909-5 pp. 68-100, p. 95-p. 97, 18 pages, Jan. 1, 1981.

Stoppa, Matteo, Wearable Electronics and Smart Textiles: A Critical Review, In Proceedings of Sensors, vol. 14, Issue 7, pp. 11957-11992, Jul. 7, 2014.

Wang, Wenjin, et al., Exploiting Spatial Redundancy of Image Sensor for Motion Robust rPPG, In Proceedings: IEEE Transactions on Biomedical Engineering, vol. 62, Issue 2, 11 pages, Jan. 19, 2015.

Wang, Yazhou, et al., Micro-Doppler Signatures for Intelligent Human Gait Recognition Using a UWB Impulse Radar, 2011 IEEE International Symposium on Antennas and Propagation (APSURSI), pp. 2103-2106, Jul. 3, 2011.

Wijesiriwardana, R, et al., Capacitive Fibre-Meshed Transducer for Touch & Proximity Sensing Applications, IEEE Sensors Journal, IEEE Service Center, 5 pages, Oct. 1, 2005.

Zhadobov, Maxim, et al., Millimeter-wave Interactions with the Human Body: State of Knowledge and Recent Advances, International Journal of Microwave and Wireless Technologies, 11 pages, Mar. 1, 2011.

Zhadobov, Maxim, et al., Millimeter-Wave Interactions with the Human Body: State of Knowledge and Recent Advances, International Journal of Microwave and Wireless Technologies, p. 1 of 11. # Cambridge University Press and the European Microwave Association, 2011; doi:10.1017/51759078711000122, 2011.

Zhang, Ruquan, et al., Study of the Structural Design and Capacitance Characteristics of Fabric Sensor, Advanced Materials Research (vols. 194-196), 8 pages, Feb. 21, 2011.

Zheng, Chuan, et al., Doppler Bio-Signal Detection Based Time-Domain Hand Gesture Recognition, 2013 IEEE MTT-S International Microwave Workshop Series on RF and Wireless Technologies for Biomedical and Healthcare Applications (IMWS-BIO), IEEE, XP032574214, DOI: 10.1109/IMWS-BIO.2013.6756200, 3 Pages, Dec. 9, 2013.

"Final Office Action", U.S. Appl. No. 15/287,359, dated Feb. 19, 2020, 16 Pages.

"Foreign Office Action", Korean Application No. 1020187004283, dated Jan. 3, 2020, 8 pages.

"Non-Final Office Action", U.S. Appl. No. 16/252,477, dated Jan. 10, 2020, 13 Pages.

(56) References Cited

OTHER PUBLICATIONS

"Notice of Allowance", U.S. Appl. No. 15/462,957, dated Jan. 23, 2020, 8 Pages.
"Notice of Allowance", U.S. Appl. No. 16/356,748, dated Feb. 11, 2020, 5 Pages.
"Notice of Allowance", U.S. Appl. No. 15/791,044, dated Feb. 12, 2020, 8 Pages.
"Notice of Allowance", U.S. Appl. No. 16/153,395, dated Feb. 20, 2020, 13 Pages.
"Notice of Allowance", U.S. Appl. No. 15/287,394, dated Mar. 4, 2020, 11 Pages.
"EP Appeal Decision", European Application No. 10194359.5, May 28, 2019, 20 pages.
"Final Office Action", U.S. Appl. No. 15/462,957, dated Nov. 8, 2019, 10 Pages.
"Foreign Office Action", Korean Application No. 1020197004803, dated Oct. 14, 2019, 2 pages.
"Foreign Office Action", Japanese Application No. 2018501256, dated Oct. 23, 2019, 5 pages.
"Foreign Office Action", British Application No. 1621332.4, dated Nov. 6, 2019, 3 pages.
"Foreign Office Action", Japanese Application No. 2018156138, dated Sep. 30, 2019, 3 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"Non-Final Office Action", U.S. Appl. No. 15/596,702, dated Oct. 21, 2019, 21 Pages.
"Non-Final Office Action", U.S. Appl. No. 16/153,395, dated Oct. 22, 2019, 10 Pages.
"Notice of Allowance", U.S. Appl. No. 16/238,464, dated Nov. 4, 2019, 10 Pages.
"Notice of Allowance", U.S. Appl. No. 15/424,263, dated Nov. 14, 2019, 10 Pages.
"Samsung Galaxy S4 Air Gestures", Video retrieved from https://www.youtube.com/watch?v=375Hb87yGcg, May 7, 2013, 4 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.
Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
"Final Office Action", U.S. Appl. No. 15/287,394, dated Sep. 30, 2019, 38 Pages.
"Final Office Action", U.S. Appl. No. 16/238,464, dated Jul. 25, 2019, 15 pages.
"Non-Final Office Action", U.S. Appl. No. 15/286,537, dated Sep. 3, 2019, 28 Pages.
"Non-Final Office Action", U.S. Appl. No. 15/791,044, dated Sep. 30, 2019, 22 Pages.
"Notice of Allowance", U.S. Appl. No. 15/287,308, dated Jul. 17, 2019, 17 Pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 Pages.
"Notice of Allowance", U.S. Appl. No. 15/287,253, dated Aug. 26, 2019, 13 Pages.
"Notice of Allowance", U.S. Appl. No. 16/356,748, dated Oct. 17, 2019, 9 Pages.
"Notice of Allowance", U.S. Appl. No. 15/287,155, dated Jul. 25, 2019, 7 pages.
"Pre-Interview ", U.S. Appl. No. 16/401,611, dated Apr. 13, 2020, 4 Pages.
"Corrected Notice of Allowance", U.S. Appl. No. 16/252,477, dated Sep. 30, 2020, 2 pages.
"Corrected Notice of Allowance", U.S. Appl. No. 16/380,245, dated Jan. 15, 2020, 2 pages.
"Foreign Office Action", CN Application No. 201680038897.4, dated Jun. 29, 2020, 28 pages.
"Foreign Office Action", Japanese Application No. 2019-078554, dated Jul. 21, 2020, 12 pages.
"Foreign Office Action", CN Application No. 201710922856.8, dated Jun. 19, 2020, 11 pages.
"Foreign Office Action", Indian Application No. 201747044162, dated Sep. 3, 2020, 7 pages.
"Foreign Office Action", KR Application No. 1020187004283, dated Sep. 11, 2020, 3 pages.
"Non-Final Office Action", U.S. Appl. No. 15/287,359, dated Jun. 26, 2020, 19 Pages.
"Non-Final Office Action", U.S. Appl. No. 16/744,626, dated Sep. 23, 2020, 9 Pages.
"Non-Final Office Action", U.S. Appl. No. 16/689,519, dated Oct. 20, 2020, 22 pages.
"Non-Final Office Action", U.S. Appl. No. 16/669,842, dated Sep. 3, 2020, 12 pages.
"Notice of Allowance", U.S. Appl. No. 16/401,611, dated Jun. 10, 2020, 17 Pages.
"Notice of Allowance", U.S. Appl. No. 16/252,477, dated Jun. 24, 2020, 8 Pages.
"Notice of Allowance", U.S. Appl. No. 15/093,533, dated Jul. 16, 2020, 5 Pages.
"Notice of Allowance", U.S. Appl. No. 15/142,471, dated Aug. 6, 2020, 7 Pages.
"Notice of Allowance", U.S. Appl. No. 16/380,245, dated Sep. 15, 2020, 7 Pages.
"Notice of Allowance", U.S. Appl. No. 16/560,085, dated Oct. 19, 2020, 8 pages.
"Pre-Interview Communication", U.S. Appl. No. 16/380,245, dated Jun. 15, 2020, 3 Pages.
"Corrected Notice of Allowance", U.S. Appl. No. 16/380,245, dated Jan. 6, 2021, 2 pages.
"Corrected Notice of Allowance", U.S. Appl. No. 16/560,085, dated Dec. 14, 2020, 2 pages.
"Corrected Notice of Allowance", U.S. Appl. No. 16/380,245, dated Dec. 18, 2020, 2 pages.
"Foreign Office Action", Japanese Application No. 2020027181, dated Nov. 17, 2020, 16 pages.
"Foreign Office Action", EP Application No. 16784352.3, dated Dec. 9, 2020, 5 pages.
"Non-Final Office Action", U.S. Appl. No. 15/287,359, dated Oct. 28, 2020, 19 pages.
"Notice of Allowability", U.S. Appl. No. 16/560,085, dated Nov. 12, 2020, 2 pages.
"Notice of Allowance", U.S. Appl. No. 16/744,626, dated Jan. 1, 2021, 10 pages.
"Notice of Allowance", U.S. Appl. No. 16/669,842, dated Dec. 18, 2020, 8 pages.
Guerra, et al., "Millimeter-Wave Personal Radars for 3D Environment Mapping", 48th Asilomar Conference on Signals, Systems and Computer, Nov. 2014, pp. 701-705.
"Corrected Notice of Allowance", U.S. Appl. No. 16/560,085, dated Jan. 28, 2021, 2 pages.
"Corrected Notice of Allowance", U.S. Appl. No. 16/744,626, dated Feb. 3, 2021, 2 pages.
"Corrected Notice of Allowance", U.S. Appl. No. 16/669,842, dated Feb. 18, 2021, 2 pages.
"Final Office Action", U.S. Appl. No. 16/689,519, dated Apr. 29, 2021, 13 pages.
"Foreign Office Action", CN Application No. 201680038897.4, dated Feb. 1, 2021, 30 pages.
"Non-Final Office Action", U.S. Appl. No. 16/822,601, dated Mar. 15, 2021, 17 pages.
"Non-Final Office Action", U.S. Appl. No. 16/843,813, dated Mar. 18, 2021, 12 pages.
"Non-Final Office Action", U.S. Appl. No. 17/005,207, dated Apr. 1, 2021, 23 pages.
"Notice of Allowance", U.S. Appl. No. 15/287,359, dated Apr. 14, 2021, 7 pages.

(56) References Cited

OTHER PUBLICATIONS

"Restriction Requirement", U.S. Appl. No. 16/563,124, dated Apr. 5, 2021, 7 pages.
Felch, et al., "Standard Radar API: Proposal Version 0.1", Technical Disclosure Commons, Jan. 24, 2021, 18 pages.
"Advisory Action", U.S. Appl. No. 16/689,519, dated Jun. 30, 2021, 2 pages.
"Corrected Notice of Allowance", U.S. Appl. No. 16/563,124, dated Jul. 23, 2021, 2 pages.
"Corrected Notice of Allowance", U.S. Appl. No. 17/005,207, dated Aug. 2, 2021, 2 pages.
"Corrected Notice of Allowance", U.S. Appl. No. 16/843,813, dated Aug. 6, 2021, 2 pages.
"Foreign Office Action", KR Application No. 1020217011901, dated Jun. 4, 2021, 5 pages.
"Notice of Allowance", U.S. Appl. No. 14/504,121, dated Jun. 1, 2021, 8 pages.
"Notice of Allowance", U.S. Appl. No. 16/843,813, dated Jun. 30, 2021, 8 pages.
"Notice of Allowance", U.S. Appl. No. 16/563,124, dated Jul. 8, 2021, 9 pages.
"Notice of Allowance", U.S. Appl. No. 17/005,207, dated Jul. 14, 2021, 5 pages.
"Notice of Allowance", U.S. Appl. No. 16/822,601, dated Aug. 5, 2021, 9 pages.
"Patent Board Decision", U.S. Appl. No. 14/504,121, dated May 20, 20201, 9 pages.

* cited by examiner

RADAR-ENABLED SENSOR FUSION

PRIORITY

This application claims priority to U.S. Non-Provisional patent application Ser. No. 15/286,512 filed on Oct. 5, 2016, which, in turn, claims priority to U.S. Provisional Patent Application Ser. No. 62/237,975 filed on Oct. 6, 2015, the disclosure of which is incorporated by reference herein in its entirety.

BACKGROUND

Many computing devices and electronic devices include sensors to provide a seamless and intuitive user experience based on a device's surroundings. For example, a device may exit a sleep state responsive to an accelerometer indicating device movement or a touch screen of the device can be disabled responsive to a proximity sensor that indicates proximity with the user's face. Most of these sensors, however, have limited accuracy, range, or functionality, and are only able to sense a coarse or drastic change of the device's surroundings. Thus, without accurate sensor input, the device is often left to infer different types of user interaction or whether the user is even present, which results in incorrect user input, false or non-detection of the user, and user frustration.

Examples of sensor inaccuracy in the above context include a device that incorrectly exits the sleep state responsive to an accelerometer sensing non-user-related movement (e.g., a moving vehicle) and disabling a touch screen in response to a user holding a device incorrectly and partially obstructing the proximity sensor. In such cases, a device's battery can be run down due to inadvertent power state transitions and user input through the touch screen is disrupted until the user moves his hand. These are just a few examples of sensor inaccuracy that can disrupt the user's interactive experience with the device.

SUMMARY

This disclosure describes apparatuses and techniques for radar-enabled sensor fusion. In some embodiments, a radar field is provided and reflection signals that correspond to a target in the radar field are received. The reflection signals are transformed to provide radar data, from which a radar feature indicating a physical characteristic of the target is extracted. Based on the radar features, a sensor is activated to provide supplemental sensor data associated with the physical characteristic. The radar feature is then augmented with the supplemental sensor data to enhance the radar feature, such as by increasing an accuracy or resolution of the radar feature. By so doing, performance of sensor-based applications, which rely on the enhanced radar features, can be improved In other aspects, a radar sensor of a device is activated to obtain radar data for a space of interest. Three-dimensional (3D) radar features are extracted from the radar data and positional data is received from sensors. Based on the positional data, spatial relation of the 3D radar features is determined to generate a set of 3D landmarks for the space. This set of 3D landmarks is compared with known 3D context models to identify a 3D context model that matches the 3D landmarks. Based on the matching 3D context model, a context for the space is retrieved and used to configure contextual settings of the device.

This summary is provided to introduce simplified concepts concerning radar-enabled sensor fusion, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of radar-enabled sensor fusion are described with reference to the following drawings. The same numbers are used throughout the drawings to reference like features and components.

DETAILED DESCRIPTION

Overview

Conventional sensor techniques are often limited and inaccurate due to inherent weaknesses associated with a given type of sensor. For example, motion can be sensed through data provided by an accelerometer, yet the accelerometer data may not be useful to determine a source of the motion. In other cases, a proximity sensor may provide data sufficient to detect proximity with an object, but an identity of the object may not be determinable from the proximity data. As such, conventional sensors have weaknesses or blind spots that can result in inaccurate or incomplete sensing of a device's surrounding, including the device's relation to a user.

Apparatuses and techniques are described herein that implement radar-enabled sensor fusion. In some embodiments, respective strengths of sensors are combined with a radar to mitigate a respective weakness of each sensor. For example, a surface radar feature of a user's face can be combined with imagery of a red-green-blue (RGB) camera to improve accuracy of facial recognition application. In other cases, a radar motion feature, which is able to track fast motion, is combined with imagery of an RGB sensor, which excels at capturing spatial information, to provide an application that is capable of detecting fast spatial movements.

In yet other cases, radar surface features can be augmented with orientation or directional information from an accelerometer to enable mapping of a device's environment (e.g., rooms or spaces). In such cases, the device may learn or detect contexts in which the device is operating thereby enabling various contextual features and settings of the device. These are but a few examples of ways in which radar can be leveraged for sensor fusion or contextual sensing, which are described herein. The following discussion first describes an operating environment, followed by techniques that may be employed in this environment, and ends with example systems.

Operating Environment

Figure 1:
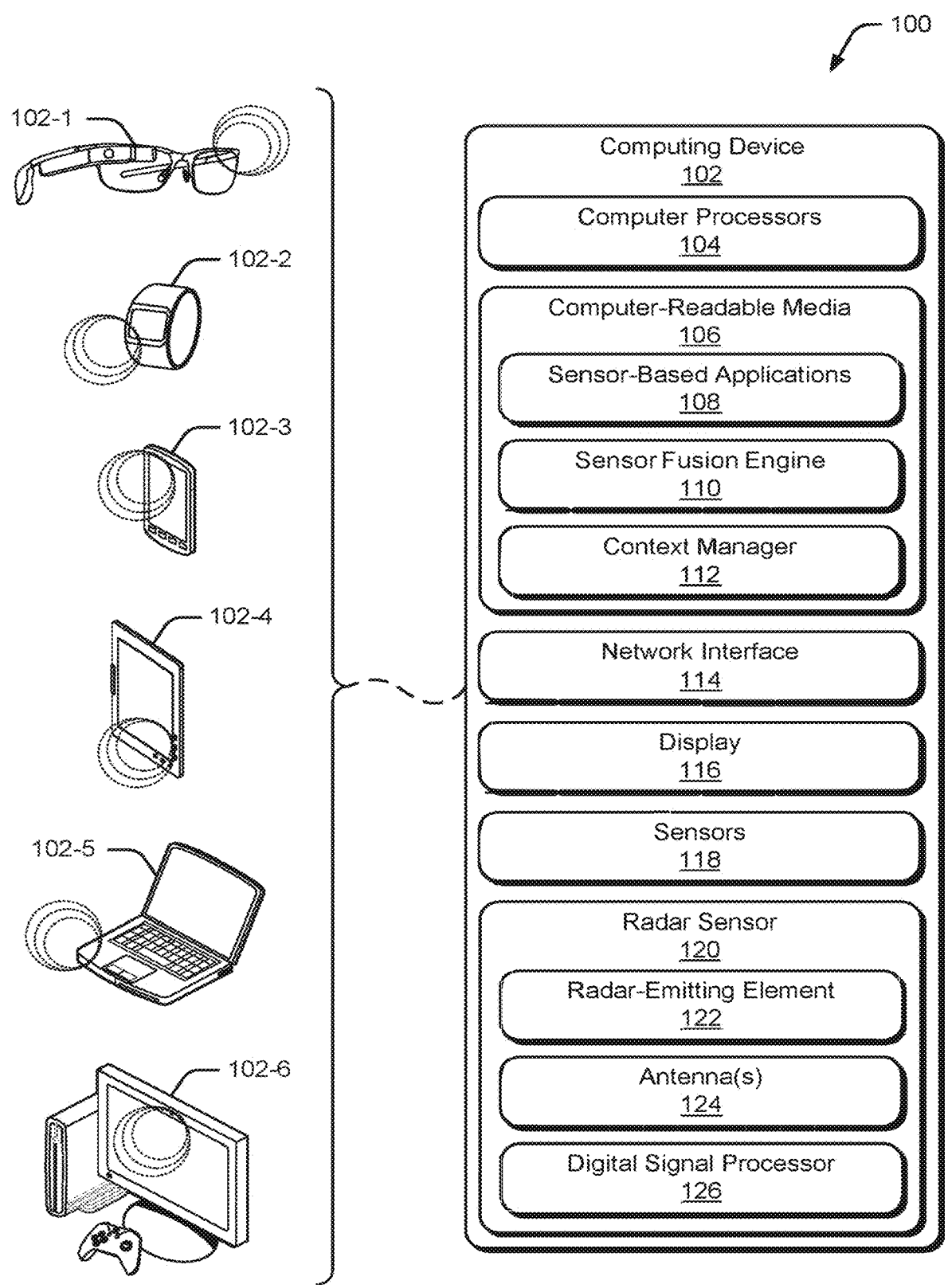
FIG. 1 illustrates an example environment that includes a computing device having a radar sensor and additional sensors.

FIG. 1 illustrates a computing device through which radar-enabled sensor fusion can be enabled. Computing device 102 is illustrated with various non-limiting example devices, smart-glasses 102-1, a smart-watch 102-2, a smart-phone 102-3, a tablet 102-4, a laptop computer 102-5, and a gaming system 102-6, though other devices may also be used, such as home automation and control systems, entertainment systems, audio systems, other home appliances, security systems, netbooks, automobiles, smart-appliances, and e-readers. Note that the computing device 102 can be wearable, non-wearable but mobile, or relatively immobile (e.g., desktops and appliances).

The computing device 102 includes one or more computer processors 104 and computer-readable media 106, which includes memory media and storage media. Applications and/or an operating system (not shown) embodied as computer-readable instructions on computer-readable media 106 can be executed by processors 104 to provide some of the functionalities described herein. The computer-readable media 106 also includes sensor-based applications 108, a sensor fusion engine 110, and a context manager 112, which are described below.

The computing device 102 may also include one or more network interfaces 114 for communicating data over wired, wireless, or optical networks and a display 116. The network interface 114 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. The display 116 can be integral with the computing device 102 or associated with it, such as with the gaming system 102-6.

The computing device 102 includes one or more sensors 118, which enable the computing device 102 to sense various properties, variances, stimuli, or characteristics of an environment in which computing device 102 operates. For example, the sensors 118 may include various motion sensors, light sensors, acoustic sensors, and magnetic sensors. Alternately or additionally, sensors 118 enable interaction with, or receive input from, a user of computing device 102. The use and implementation of the sensors 118 varies and is described below.

The computing device 102 may also be associated with or include a radar sensor 120. The radar sensor 120 represents functionality that wirelessly detects targets through the transmission and reception of radio frequency (RF) or radar signals. The radar sensor 120 can be implemented as a system and/or radar-enabled component embedded within the computing device 102, such as a System-on-Chip (SoC) or sensor-on-chip. It is to be appreciated, however, that the radar sensor 120 can be implemented in any other suitable manner, such as one or more Integrated Circuits (ICs), as a processor with embedded processor instructions or configured to access a memory having processor instructions stored thereon, as hardware with embedded firmware, a printed circuit board assembly with various hardware components, or any combination thereof. Here, the radar sensor 120 includes radar-emitting element 122, antenna(s) 124, and digital signal processor 126, which can be used in concert to wirelessly detect various types of targets in the environment of the computing device 102.

Generally, radar-emitting element 122 is configured to provide a radar field. In some cases, the radar field is configured to at least partially reflect off one or more target objects. In some cases, the target objects include device users or other people present in the environment of the computing device 102. In other cases, the target objects include physical features of the user, such as hand motion, breathing rates, or other physiological features. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand.

A radar field provided by the radar-emitting element 122 can be a small size, such as zero or one millimeters to 1.5 meters, or an intermediate size, such as one to 30 meters. It is to be appreciated that these sizes are merely for discussion purposes, and that any other suitable size or range of radar field can be used. For example, when the radar field has an intermediate size, the radar sensor 120 can be configured to receive and process reflections of the radar field to provide large-body gestures based on reflections from human tissue caused by body, arm, or leg movements.

In some aspects, the radar field can be configured to enable the radar sensor 120 to detect smaller and more-precise gestures, such as micro-gestures. Example intermediate-sized radar fields include those in which a user makes gestures to control a television from a couch, change a song or volume from a stereo across a room, turn off an oven or oven timer (a near field would also be useful here), turn lights on or off in a room, and so forth. The radar sensor 120, or emitter thereof, can be configured to emit continuously modulated radiation, ultra-wideband radiation, or sub-millimeter-frequency radiation.

The antenna(s) 124 transmit and receive RF signals of the radar sensor 120. In some cases, the radar-emitting element 122 is coupled with the antennas 124 to transmit a radar field. As one skilled in the art will appreciate, this is achieved by converting electrical signals into electromagnetic waves for transmission, and vice versa for reception. The radar sensor 120 can include one or an array of any suitable number of antennas in any suitable configuration. For instance, any of the antennas 124 can be configured as a dipole antenna, a parabolic antenna, a helical antenna, a planar antenna, an inverted-F antenna, a monopole antenna, and so forth. In some embodiments, the antennas 124 are constructed or formed on-chip (e.g., as part of a SoC), while in other embodiments, the antennas 124 are separate components, metal, dielectrics, hardware, etc. that attach to, or are included within, radar sensor 120.

A first antenna 124 can be single-purpose (e.g., a first antenna can be directed towards transmitting signals, and a second antenna 124 can be directed towards receiving signals), or multi-purpose (e.g., an antenna is directed towards transmitting and receiving signals). Thus, some embodiments utilized varying combinations of antennas, such as an embodiment that utilizes two single-purpose antennas configured for transmission in combination with four single-purpose antennas configured for reception. The placement, size, and/or shape of the antennas 124 can be chosen to enhance a specific transmission pattern or diversity scheme, such as a pattern or scheme designed to capture information about the environment, as further described herein.

In some cases, the antennas 124 can be physically separated from one another by a distance that allows the radar sensor 120 to collectively transmit and receive signals directed to a target object over different channels, different radio frequencies, and different distances. In some cases, the antennas 124 are spatially distributed to support triangulation techniques, while in others the antennas are collocated to support beamforming techniques. While not illustrated, each antenna can correspond to a respective transceiver path that physically routes and manages the outgoing signals for transmission and the incoming signals for capture and analysis.

The digital signal processor 126 ((DSP) or digital signal processing component) generally represents operations related to digitally capturing and processing a signal. For instance, the digital signal processor 126 samples analog RF signals received by the antenna(s) 124 to generate radar data (e.g., digital samples) that represents the RF signals, and then processes this radar data to extract information about the target object. In some cases, the digital signal processor 126 performs a transform on the radar data to provide a radar feature that describes target characteristics, position, or dynamics. Alternately or additionally, the digital signal processor 126 controls the configuration of signals generated and transmitted by the radar-emitting element 122 and/or antennas 124, such as configuring a plurality of signals to form a specific diversity or beamforming scheme.

In some cases, the digital signal processor 126 receives input configuration parameters that control an RF signal's transmission parameters (e.g., frequency channel, power level, etc.), such as through the sensor-based applications 108, sensor fusion engine 110, or context manager 112. In turn, the digital signal processor 126 modifies the RF signal based upon the input configuration parameter. At times, the signal processing functions of the digital signal processor 126 are included in a library of signal processing functions or algorithms that are also accessible and/or configurable via the sensor-based applications 108 or application programming interfaces (APIs). The digital signal processor 126 can be implemented in hardware, software, firmware, or any combination thereof.

Figure 2:
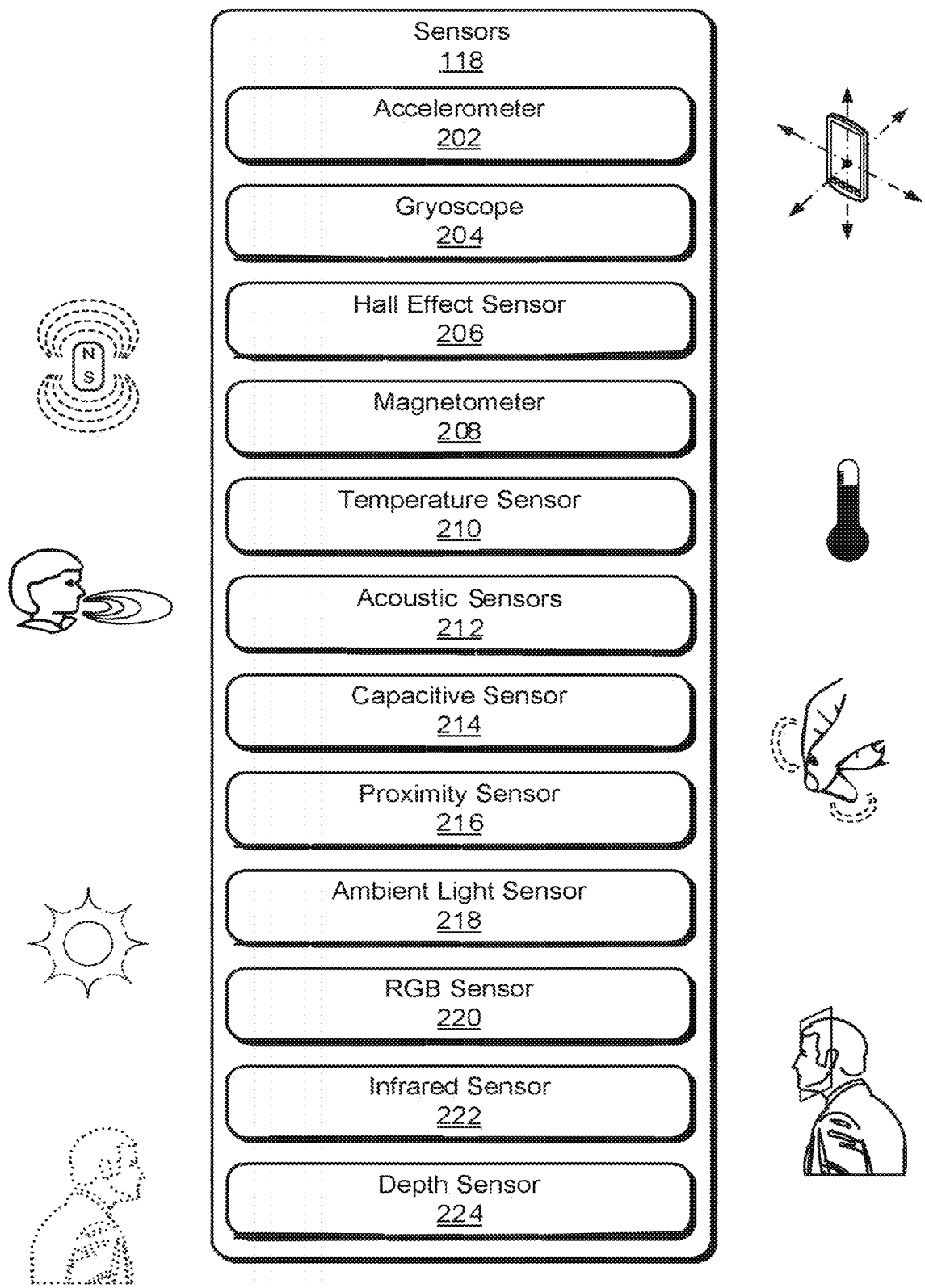
FIG. 2 illustrates example types and configurations of the sensors shown in FIG. 1.

FIG. 2 illustrates example types and configurations of the sensors 118 that can be used to implement embodiments of radar-enabled sensor fusion generally at 200. These sensors 118 enable the computing device 102 to sense various properties, variances, stimuli, or characteristics of an environment in which computing device 102 operates. Data provided by the sensors 118 is accessible to other entities of the computing device, such as the sensor fusion engine 110 or the context manager 112. Although not shown, the sensors 118 may also include global-positioning modules, micro-electromechanical systems (MEMS), resistive touch sensors, and so on. Alternately or additionally, the sensors 118 can enable interaction with, or receive input from, a user of the computing device 102. In such a case, the sensors 118 may include piezoelectric sensors, touch sensors, or input sensing-logic associated with hardware switches (e.g., keyboards, snap-domes, or dial-pads), and so on.

In this particular example, the sensors 118 include an accelerometer 202 and gyroscope 204. These and other motion and positional sensors, such as motion sensitive MEMS or global positioning systems (GPSs) (not shown), are configured to sense movement or orientation of the computing device 102. The accelerometer 202 or gyroscope 204 can sense movement or orientation of the device in any suitable aspect, such as in one-dimension, two-dimensions, three-dimensions, multi-axis, combined multi-axis, and the like. Alternately or additionally, positional sensor, such as a GPS, may indicate a distance traveled, rate of travel, or an absolute or relative position of the computing device 102. In some embodiments, the accelerometer 202 or gyroscope 204 enable computing device 102 to sense gesture inputs (e.g., a series of position and/or orientation changes) made when a user moves the computing device 102 in a particular way.

The computing device 102 also includes a hall effect sensor 206 and magnetometer 208. Although not shown, the computing device 102 may also include a magneto-diode, magneto-transistor, magnetic sensitive MEMS, and the like. These magnetic field-based sensors are configured to sense magnetic field characteristics around computing device 102. For example, the magnetometer 208 may sense a change in magnetic field strength, magnetic field direction, or magnetic field orientation. In some embodiments, computing device 102 determines proximity with a user or another device based on input received from the magnetic field-based sensors.

A temperature sensor 210 of the computing device 102 can sense a temperature of a housing of the device or ambient temperature of the device's environment. Although not shown, the temperature sensor 210 may also be implemented in conjunction with a humidity sensor that enables moisture levels to be determined. In some cases, the temperature sensor can sense a temperature of a user that is holding, wearing, or carrying, the computing device 102. Alternately or additionally, the computing device may include an infrared thermal sensor that can sense temperature remotely or without having physical contact with an object of interest.

The computing device 102 also includes one or more acoustic sensors 212. The acoustic sensors can be implemented as microphones or acoustic wave sensors configured to monitor sound of an environment that computing device 102 operates. The acoustic sensors 212 are capable of receiving voice input of a user, which can then be processed by a DSP or processor of computing device 102. Sound captured by the acoustic sensors 212 may be analyzed or measured for any suitable component, such as pitch, timbre, harmonics, loudness, rhythm, envelope characteristics (e.g., attack, sustain, decay), and so on. In some embodiments, the computing device 102 identifies or differentiates a user based on data received from the acoustic sensors 212.

Capacitive sensors 214 enable the computing device 102 to sense changes in capacitance. In some cases, the capacitance sensors 214 are configured as touch sensors that can receive touch input or determine proximity with a user. In other cases, the capacitance sensors 214 are configured to sense properties of materials proximate a housing of the computing device 102. For example, the capacitance sensors 214 may provide data indicative of the devices proximity with respect to a surface (e.g., table or desk), body of a user, or the user's clothing (e.g., clothing pocket or sleeve). Alternately or additionally, the capacitive sensors may be configured as a touch screen or other input sensor of the computing device 102 through which touch input is received.

The computing device 102 may also include proximity sensors 216 that sense proximity with objects. The proximity sensors may be implemented with any suitable type of sensor, such as capacitive or infrared (IR) sensors. In some cases, the proximity sensor is configured as a short-range IR emitter and receiver. In such cases, the proximity sensor may be located within a housing or screen of the computing device 102 to detect proximity with a user's face or hand. For example, a proximity sensor 216 of a smart-phone may enable detection of a user's face, such as during a voice call, in order to disable a touch screen of the smart-phone to prevent the reception of inadvertent user input.

An ambient light sensor 218 of the computing device 102 may include a photo-diode or other optical sensors configured to sense an intensity, quality, or changes in light of the environment. The light sensors are capable of sensing ambient light or directed light, which can then be processed by the computing device 102 (e.g., via a DSP) to determine aspects of the device's environment. For example, changes in ambient light may indicate that a user has picked up the computing device 102 or removed the computing device 102 from his or her pocket.

In this example, the computing device also includes a red-green-blue sensor 220 (RGB sensor 220) and an infrared sensor 222. The RGB sensor 220 may be implemented as a camera sensor configured to capture imagery in the form of images or video. In some cases, the RGB sensor 220 is associated with a light-emitting diode (LED) flash increase luminosity of the imagery in low-light environments. In at least some embodiments, the RGB sensor 220 can be implemented to capture imagery associated with a user, such as a user's face or other physical features that enable identification of the user.

The infrared sensor 222 is configured to capture data in the infrared frequency spectrum, and may be configured to sense thermal variations or as an infrared (IR) camera. For example, the infrared sensor 222 may be configured to sense thermal data associated with a user or other people in the device's environment. Alternately or additionally, the infrared sensor may be associated with an IR LED and configured to sense proximity with or distance to an object.

In some embodiments, the computing device includes a depth sensor 224, which may be implemented in conjunction with the RGB senor 220 to provide RGB-enhanced depth information. The depth sensor 222 may be implemented as a single module or separate components, such as an IR emitter, IR camera, and depth processor. When implemented separately, the IR emitter emits IR light that is received by the IR camera, which provides IR imagery data to the depth processor. Based on known variables, such as the speed of light, the depth processor of the depth sensor 224 can resolve distance to a target (e.g., time-of-flight camera). Alternately or additionally, the depth sensor 224 may resolve a three-dimensional depth map of the object's surface or environment of the computing device.

From a power consumption viewpoint, each of the sensors 118 may consume a different respective amount of power while operating. For example, the magnetometer 208 or acoustic sensor 212 may consume tens of milliamps to operate while the RGB sensor, infrared sensor 222, or depth sensor 224 may consume hundreds of milliamps to operate. In some embodiments, power consumption of one or more of the sensors 118 is known or predefined such that lower power sensors can be activated in lieu of other sensors to obtain particular types of data while conserving power. In many cases, the radar sensor 120 can operate, either continuously or intermittently, to obtain various data while consuming less power than the sensors 118. In such cases, the radar sensor 120 may operate while all or most of the sensors 118 are powered-down to conserve power of the computing device 102. Alternately or additionally, a determination can be made, based on data provided by the radar sensor 120, to activate one of the sensors 118 to obtain additional sensor data.

Figure 3:
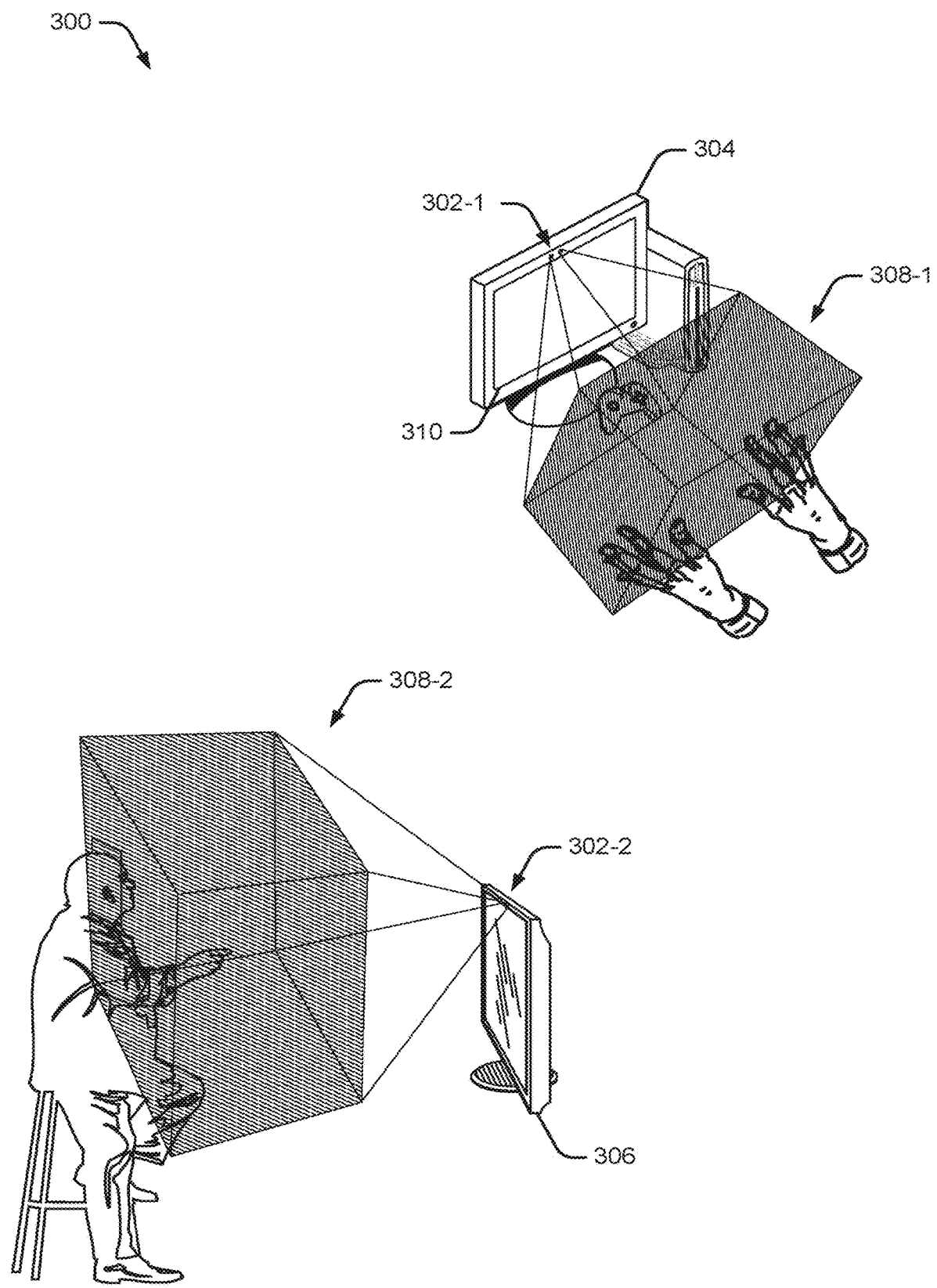
FIG. 3 illustrates example implementations of the radar sensor shown in FIG. 1 and corresponding radar fields.

FIG. 3 illustrates example configurations of the radar sensor 120 and radar fields provided thereby generally at 300. In the context of FIG. 3, two example configurations of the radar sensor 120 are illustrated, a first in which a radar sensor 302-1 is embedded in a gaming system 304 and a second in which a radar sensor 302-2 is embedded in a television 306. The radar sensors 302-1 and 302-2 may be implemented similarly to or differently from each other or the radar sensors described elsewhere herein. In the first example, the radar sensor 302-1 provides a near radar field to interact with the gaming system 304, and in the second, the radar sensor 302-2 provides an intermediate radar field (e.g., a room size) to interact with the television 306. These radar sensors 302-1 and 302-2 provide near radar field 308-1 and intermediate radar field 308-2, respectively, and are described below.

The gaming system 304 includes, or is associated with, the radar sensor 302-1. These devices work together to improve user interaction with the gaming system 304. Assume, for example, that the gaming system 304 includes a touch screen 310 through which content display and user interaction can be performed. This touch screen 310 can present some challenges to users, such as needing a person to sit in a particular orientation, such as upright and forward, to be able to touch the screen. Further, the size for selecting controls through touch screen 310 can make interaction difficult and time-consuming for some users. Consider, however, the radar sensor 302-1, which provides near radar field 308-1 enabling a user's hands to interact with desktop computer 304, such as with small or large, simple or complex gestures, including those with one or two hands, and in three dimensions. As is readily apparent, a large volume through which a user may make selections can be substantially easier and provide a better experience over a flat surface, such as that of touch screen 310.

Similarly, consider the radar sensor 302-2, which provides the intermediate radar field 308-2. Providing a radar-field enables a variety of interactions with a user positioned in front of the television. For example, the user may interact with the television 306 from a distance and through various gestures, ranging from hand gestures, to arm gestures, to full-body gestures. By so doing, user selections can be made simpler and easier than a flat surface (e.g., touch screen 310), a remote control (e.g., a gaming or television remote), and other conventional control mechanisms. Alternately or additionally, the television 306 may determine, via the radar sensor 302-2, an identity of the user, which can be provided to sensor-based applications to implement other functions (e.g., content control).

Figure 4:
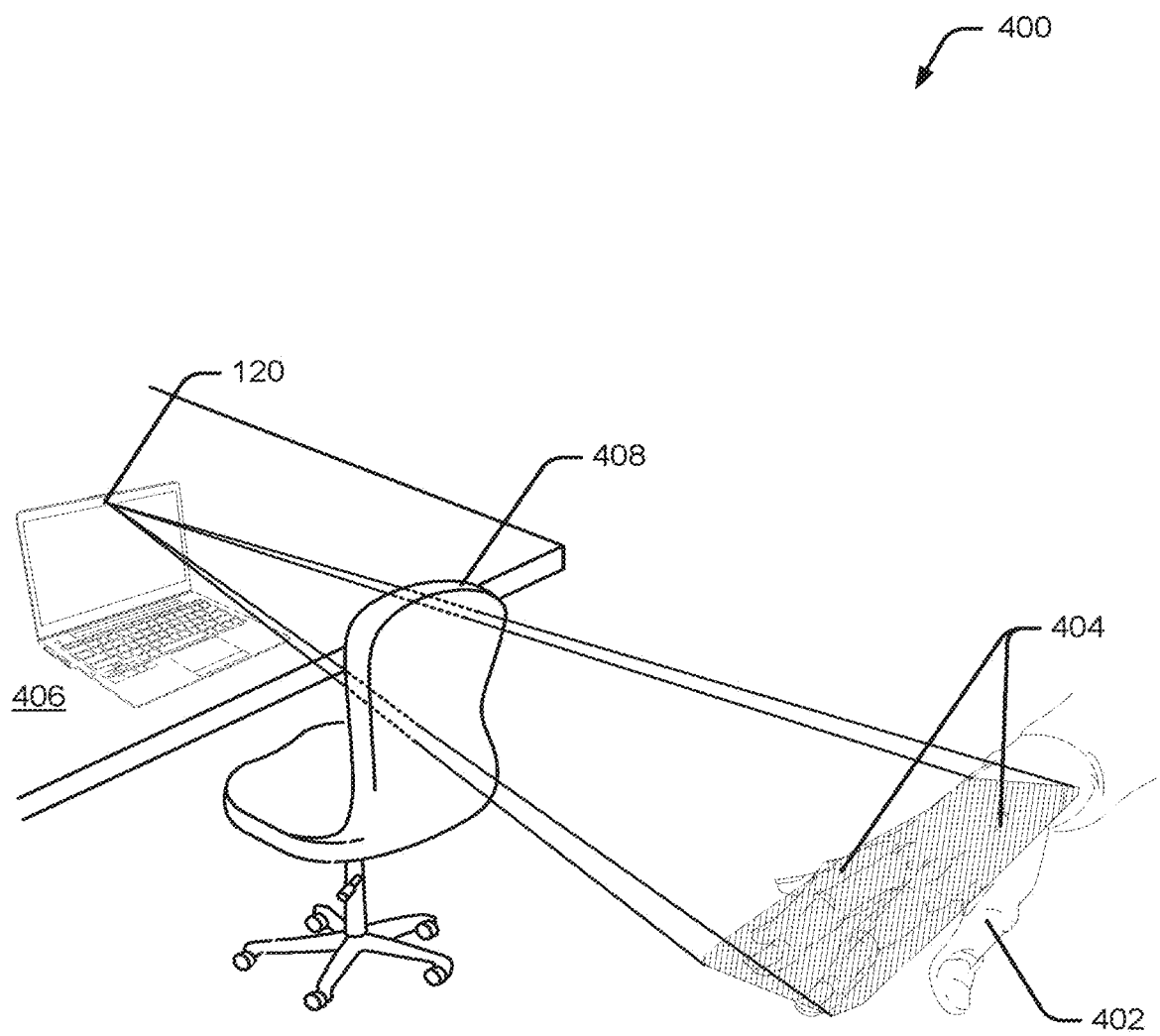
FIG. 4 illustrates another example implementation of the radar sensor shown in FIG. 1 and a penetrating radar field.

FIG. 4 illustrates another example configuration of the radar sensor and a penetrating radar field provided thereby at 400. In this particular example, a surface to which the radar field is applied human tissue. As shown, a hand 402 having a surface radar field 404 provided by the radar sensor 120 (of FIG. 1) that is included in a laptop 406. A radar-emitting element 122 (not shown) provides the surface radar field 404 that penetrates a chair 408 and is applied to the hand 402. In this case, the antennas 124 are configured to receive a reflection caused by an interaction on the surface of the hand 402 that penetrates (e.g., reflects back through) the chair 408. Alternately, the radar sensor 120 can be configured to provide and receive reflections through fabric, such as when a smart-phone is placed in a user's pocket. Thus, the radar sensor 120 may map or scan spaces through an optical occlusion, such as fabric, clothing, and other non-transparent material.

In some embodiments, the digital signal processor 126 is configured to process the received reflection signal from the surface sufficient to provide radar data usable to identify the hand 402 and/or determine a gesture made thereby. Note that with the surface radar field 404, another hand may by identified or interact to perform gestures, such as to tap on the surface on the hand 402, thereby interacting with the surface radar field 404. Example gestures include single and multi-finger swipe, spread, squeeze, non-linear movements, and so forth. Or the hand 402 may simply move or change shape to cause reflections, thereby also performing an occluded gesture.

With respect to human-tissue reflection, reflecting radar fields can process these fields to determine identifying indicia based on the human-tissue reflection, and confirm that the identifying indicia matches recorded identifying indicia for a person, such as authentication for a person permitted to control a corresponding computing device. These identifying indicia can include various biometric identifiers, such as a size, shape, ratio of sizes, cartilage structure, and bone structure for the person or a portion of the person, such as the person's hand. These identify indicia may also be associated with a device worn by the person permitted to control the mobile computing device, such as device having a unique or difficult-to-copy reflection (e.g., a wedding ring of 14 carat gold and three diamonds, which reflects radar in a particular manner).

In addition, the radar sensor systems can be configured so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 5:
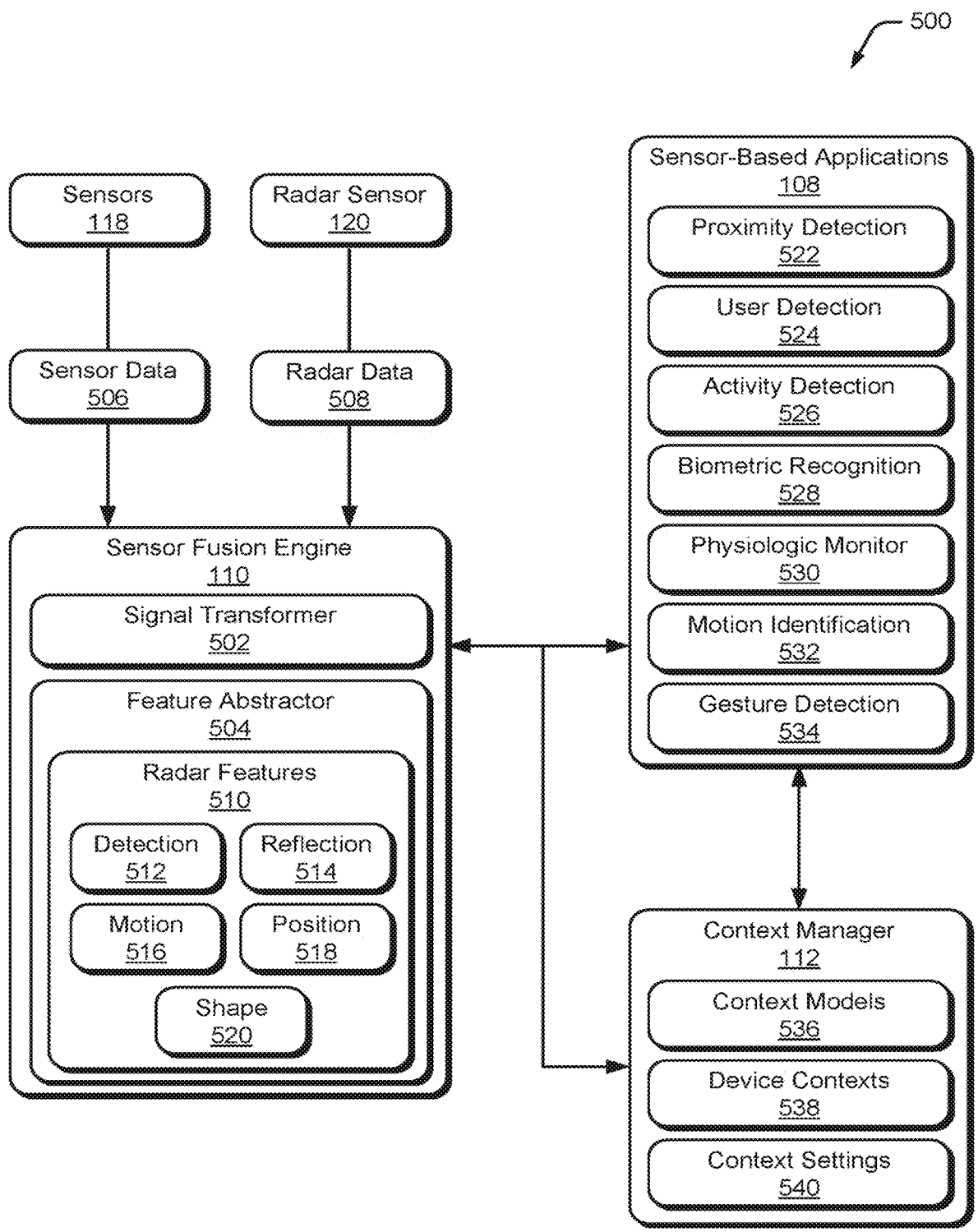
FIG. 5 illustrates an example of configuration of components capable of implementing radar-enabled sensor fusion.

FIG. 5 illustrates an example configuration of components capable of implementing radar-enabled sensor fusion generally at 500, including the sensor fusion engine 110 and context manager 112. Although shown as separate entities, the radar sensor 120, sensor fusion engine 110, context manager 112, and other entities may be combined with one another, organized differently, or communicate directly or indirectly through interconnections or data buses not shown. Accordingly, the implementation of the sensor fusion engine 110 and context manager 112 shown in FIG. 5 is intended to provide a non-limiting example of ways in which these entities and others described herein may interact to implement radar-enabled sensor fusion.

In this example, the sensor fusion engine includes a radar signal transformer 502 (signal transformer 502) and a radar feature extractor 504 (feature extractor 504). Although shown as separate entities embodied on the sensor fusion engine 110, the signal transformer 502 and feature abstractor 504 may also be implemented by, or within, the digital signal processor 126 of the radar sensor 120. The sensor fusion engine 110 is communicably coupled with the sensors 118, from which sensor data 506 is received. The sensor data 506 may include any suitable type of raw or pre-processed sensor data, such as data corresponding to any type of the sensors described herein. The sensor fusion engine 110 is also operably coupled with the radar sensor 120, which provides radar data 508 to the sensor fusion engine 110. Alternately or additionally, the radar data 508 provided by the radar sensor 120 may comprise real-time radar data, such as raw data representing reflection signals of a radar field as they are received by the radar sensor 120.

In some embodiments, the signal transformer 502 transforms the raw radar data representing reflection signals into radar data representations. In some cases, this includes performing signal pre-processing on the raw radar data. For example, as an antenna receives reflected signals, some embodiments sample the signals to generate a digital representation of the raw incoming signals. Once the raw data is generated, the signal transformer 502 pre-processes the raw data to clean up the signals or generate versions of the signals in a desired frequency band or desired data format. Alternately or additionally, pre-processing the raw data may include filtering the raw data to reduce a noise floor or remove aliasing, resampling the data to obtain to a different sample rate, generating a complex representation of the signals, and so on. The signal transformer 502 can pre-process the raw data based on default parameters, while in other cases the type and parameters of the pre-processing is configurable, such as by the sensor fusion engine 110 or the context manager 112.

The signal transformer 502 transforms the received signal data into one or more different data representations or data transforms. In some cases, the signal transformer 502 combines data from multiple paths and corresponding antennas. The combined data may include data from various combinations of transmit paths, receive paths, or combined transceiver paths of the radar sensor 120. Any suitable type of data fusion technique can be used, such as weighted integration to optimize a heuristic (e.g., signal-to-noise (SNR) ratio or minimum mean square error (MMSE)), beamforming, triangulation, and the like.

The signal transformer 502 may also generate multiple combinations of signal data for different types of feature extraction, and/or transforms the signal data into another representation as a precursor to feature extraction. For example, the signal transformer 502 can process the combined signal data to generate a three-dimensional (3D) spatial profile of the target object. However, any suitable type of algorithm or transform can be used to generate a view, abstraction, or version of the raw data, such as an I/Q transformation that yields a complex vector containing phase and amplitude information related to the target object, a beamforming transformation that yields a spatial representation of target objects within range of a gesture sensor device, or a range-Doppler algorithm that yields target velocity and direction. Other types of algorithms and transforms may include a range profile algorithm that yields target recognition information, a micro-Doppler algorithm that yields high-resolution target recognition information, and a spectrogram algorithm that yields a visual representation of the corresponding frequencies, and so forth.

As described herein, the raw radar data can be processed in several ways to generate respective transformations or combined signal data. In some cases, the same raw data can be analyzed or transformed in multiple ways. For instance, a same capture of raw data can be processed to generate a 3D profile, target velocity information, and target directional movement information. In addition to generating transformations of the raw data, the radar signal transformer can perform basic classification of the target object, such as identifying information about its presence, a shape, a size, an orientation, a velocity over time, and so forth. For example, some embodiments use the signal transformer 502 to identify a basic orientation of a hand by measuring an amount of reflected energy off of the hand over time.

These transformations and basic classifications can be performed in hardware, software, firmware, or any suitable combination. At times, the transformations and basic classifications are performed by digital signal processor 126 and/or the sensor fusion engine 110. In some cases, the signal transformer 502 transforms the raw radar data or performs a basic classification based upon default parameters, while in other cases the transformations or classifications are configurable, such as through the sensor fusion engine 110 or context manager 112.

The feature abstractor 504 receives the transformed representations of the radar data from the signal transformer 502. From these data transforms, the feature abstractor 504 resolves, extracts, or identifies one or more radar features 510. These radar features 510 may indicate various properties, dynamics, or characteristics of a target and, in this example, include detection features 512, reflection features 514, motion features 516, position features 518, and shape features 520. These features are described by way of example only, and are not intended to limit ways in which the sensor fusion engine extracts feature or gesture information from raw or transformed radar data. For example, the radar feature extractor 504 may extract alternate radar features, such as range features or image features, from radar data representations provided by the signal transformer 502.

The detection features 512 may enable the sensor fusion engine 110 to detect a presence of a user, other people, or objects in an environment of the computing device 102. In some cases, a detection feature indicates a number of targets in a radar field or a number of targets in a room or space that is swept by a radar field. The reflection features 514 may indicate a profile of energy reflected by the target, such as reflected energy over time. This can be effective to enable velocity of a target's motion to be tracked over time. Alternately or additionally, the reflection feature may indicate an energy of a strongest component or a total energy of a moving target.

The motion features 516 may enable the fusion engine 110 to track movement or motion of a target in or through a radar field. In some cases, the motion feature 516 includes a velocity centroid in one or three dimensions, or a phase-based fine target displacement in one dimension. Alternately or additionally, the motion feature may include a target velocity or a 1D velocity dispersion. In some embodiments, the position features 518 include spatial 2D or 3D coordinates of a target object. The position features 518 may also be useful to range or determine distance to a target object.

The shape features 520 indicate a shape of a target or surface, and may include a spatial dispersion. In some cases, the sensor fusion engine 110 can scan or beam form different radar fields to build a 3D representation of a target or environment of the computing device 102. For example, the shape features 520 and other of the radar features 510 can be combined by the sensor fusion engine 110 to construct a unique identifier (e.g., a fingerprint) of a particular room or space.

In some embodiments, the feature abstractor 504 builds on a basic classification identified by the signal transformer 502 for feature extraction or abstraction. Consider the above example in which the signal transformer 502 classifies a target object as a hand. The feature abstractor 504 can build from this basic classification to extract lower resolution features of the hand. In other words, if the feature abstractor 504 is provided information identifying the target object as a hand, then the feature abstractor 504 uses this information to look for hand-related features (e.g., finger tapping, shape gestures, or swipe movements) instead of head-related features, (e.g., an eye blink, mouthing a word, or head-shaking movement).

As another example, consider a scenario in which the signal transformer 502 transforms the raw radar data into a measure of the target object's velocity over time. In turn, the feature abstractor 504 uses this information to identify a finger fast-tap motion by using a threshold value to compare the target object's velocity of acceleration to the threshold value, a slow-tap feature, and so forth. Any suitable type of algorithm can be used to extract a feature, such as machine-learning algorithms implemented by a machine-learning component (not shown) of the digital signal processor 126.

In various embodiments, the sensor fusion engine 110 combines or augments the radar features 510 with sensor data 506 from the sensors 118. For example, the sensor fusion engine 110 may apply a single algorithm to extract, identify, or classify a feature, or apply multiple algorithms to extract a single feature or multiple features. Thus, different algorithms can be applied to extract different types of features on a same set of data, or different sets of data. Based on the radar feature, the sensor fusion engine 110 can activate a particular sensor to provide data that is complimentary or supplemental to the radar feature. By so doing, an accuracy or validity of the radar features can be improved with the sensor data.

The sensor fusion engine 110 provides or exposes the sensor data 506, radar data 508, or various combinations thereof to sensor-based applications 108 and the context manager 112. For example, the sensor fusion engine 110 may provide, to the sensor-based applications 108, radar data augmented with sensor data or radar data that is verified based on sensor data. The sensor-based applications 108 may include any suitable application, function, utility, or algorithm that leverages information or knowledge about the computing device 102's environment or relation thereto in order to provide device functionalities or to alter device operations.

In this particular example, the sensor-based applications 108 include proximity detection 522, user detection 524, and activity detection 526. The proximity detection application 522 may detect, based on sensor data or radar data, proximity with a user or other objects. For example, the proximity detection application 522 may use detection radar features 512 to detect an approaching object and then switch to proximity sensor data to confirm proximity with a user. Alternately or additionally, the application may leverage a shape radar feature 520 to verify that the approaching object is a user's face, and not another similar sized large body object.

The user detection application 524 may detect, based on sensor data or radar data, presence of a user. In some cases, the user detection application 524 also tracks the user when the user is detected in the environment. For example, the user detection application 524 may detect the presence based on a detection radar feature 512 and shape radar feature 520 that matches a known 3D profile of the user. The user detection application 524 can also verify detection of the user through image data provided by the RGB sensor 220 or voice data provided by the acoustic sensors 212.

In some embodiments, the activity detection application 526 uses the sensor data and the radar data to detect activity in the computing device 102's environment. The activity detection application 526 may monitor radar for detection features 512 and motion features 516. Alternately or additionally, the activity detection application 526 can use the acoustic sensors 212 to detect noise, and the RGB sensor 220 or depth sensor 224 to monitor movement.

The sensor-based applications also include biometric recognition 528, physiologic monitor 530, and motion identification 532. The biometric recognition application 528 may use sensor data and radar data to capture or obtain biometric characteristics of a user that are useful to identify that user, such as to implement facial recognition. For example, the biometric recognition application 528 can use a shape radar feature 520 to obtain a 3D map of skeletal structure of the user's face and a color image from the RGB sensor 220 to confirm the user's identity. Thus, even if an imposter was able to forge an appearance of the user, the imposter would not be able to replicate the exact facial structure of the user and thus fail identification through the biometric recognition application 528.

The physiological monitor application 530 can detect or monitor medical aspects of a user, such as breathing, heart rate, reflexes, fine motor skills, and the like. To do so, the physiological monitor application 530 may use radar data, such as to track motion of user's chest, monitor arterial flow, subdermal muscle contraction, and the like. The physiological monitor application 530 can monitor other sensors of the device for supplemental data, such as acoustic, thermal (e.g., temperature), image (e.g., skin or eye color), and motion (e.g., tremors) data. For example, the physiological monitor application 530 may monitor a user's breathing patterns with radar motion features 516, breath noises recorded by the acoustic sensors 212, and heat signatures of exhaled air captured by the infrared sensor 222.

The motion identification application 532 can use the radar data and sensor data to identify various motion signatures. In some cases, the motion radar features 516 or other radar features are useful for track motion. In such cases, the motions may be too fast for accurate capture by the RGB sensor 220 or the depth sensor 224. By using the radar features, which are able to track very fast motion, the motion identification application 532 can track motion and leverage image data from the RGB sensor 220 to provide additional spatial information. Thus, the sensor fusion engine 110 and the motion identification application 532 are able to track a fast moving object with corresponding spatial information.

The gesture detection application 534 of the sensor-based applications 108 performs gesture recognition and mapping. For instance, consider a case where a finger tap motion feature has been extracted. The gesture detection application 534 can use this information, sound data from the acoustic sensors 212, or image data from the RGB sensor 220 to identify the feature as a double-click gesture. The gesture detection application 534 may use a probabilistic determination of which gesture has most likely occurred based upon the radar data and sensor data provided by the sensor fusion engine 110, and how this information relates to one or more previously learned characteristics or features of various gestures. For example, a machine-learning algorithm can be used to determine how to weight various received characteristics to determine a likelihood these characteristics correspond to particular gestures (or components of the gestures).

The context manager 112 may access the sensor-based applications 108, sensor data 506, or the radar features 510 of the sensor fusion engine 110 to implement radar-based contextual sensing. In some embodiments, the radar data 508 can be combined with sensor data 506 to provide maps of spaces or rooms in which the computing device 102 operates. For example, position and inertial sensor data can be leveraged to implement synthetic aperture techniques for capturing and meshing 3D radar imagery. Thus, as the device moves through an environment, the context manager 112 can construct detailed or high resolution 3D maps of various spaces and rooms. Alternately or additionally, the 3D imagery can be captured through optical occlusions or be used in combination with other techniques of sensor fusion to improve activity recognition.

In this particular example, the context manager 112 includes context models 536, device contexts 538, and context settings 540. The context models 536 include physical models of various spaces, such as dimensions, geometry, or features of a particular room. In other words, a context model can be considered to describe the unique character of particular space, like a 3D fingerprint. In some cases, building the context models 536 is implemented via machine learning techniques and may be performed passively as a device enters or passes through a particular space. Device contexts 538 include and may describe multiple contexts in which the computing device 102 may operate. These contexts may include a standard set of work contexts, such as "meeting," "do not disturb," "available," "secure," "private," and the like. For example, the "meeting" context may be associated with the device being in a conference room, with multiple other coworkers and customers. Alternately or additionally, the device contexts 538 may be user programmable or custom, such as contexts for different rooms of a house, with each context indicating a respective level of privacy or security associated with that context.

Context settings 540 include various device or system settings that are configurable based on context or other environmental properties. The context settings 540 may include any suitable type of device setting, such as ringer volume, ringer mode, display modes, connectivity to networks or other devices, and the like. Alternately or additionally, the context settings 540 may include any suitable type of system settings, such as security settings, privacy settings, network or device connection settings, remote control features, and the like. For example, if a user walks into her home theater, the context manager 112 may recognize this context (e.g., "home theater") and configure context settings by muting a device's alerts and configuring a wireless interface of the device to control audio/video equipment in the home theater. This is just but one example of how context manager 112 can determine and configure a device based on context.

Having described respective examples of a computing device 102, a sensor fusion engine 110, and a context manager 112 in accordance with one or more embodiments, now consider a discussion of techniques that can be performed by those and other entities described herein to implement radar-enabled sensor fusion.

Example Methods

FIGS. 6, 8, 10, 11, 13, and 14 depict methods for implementing radar-enabled sensor fusion and/or radar-based contextual sensing. These method is shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference may be made to FIGS. 1-5, reference to which is made for example only. The techniques are not limited to performance by one entity or multiple entities operating on one device, or those described in these figures.

Figure 6:
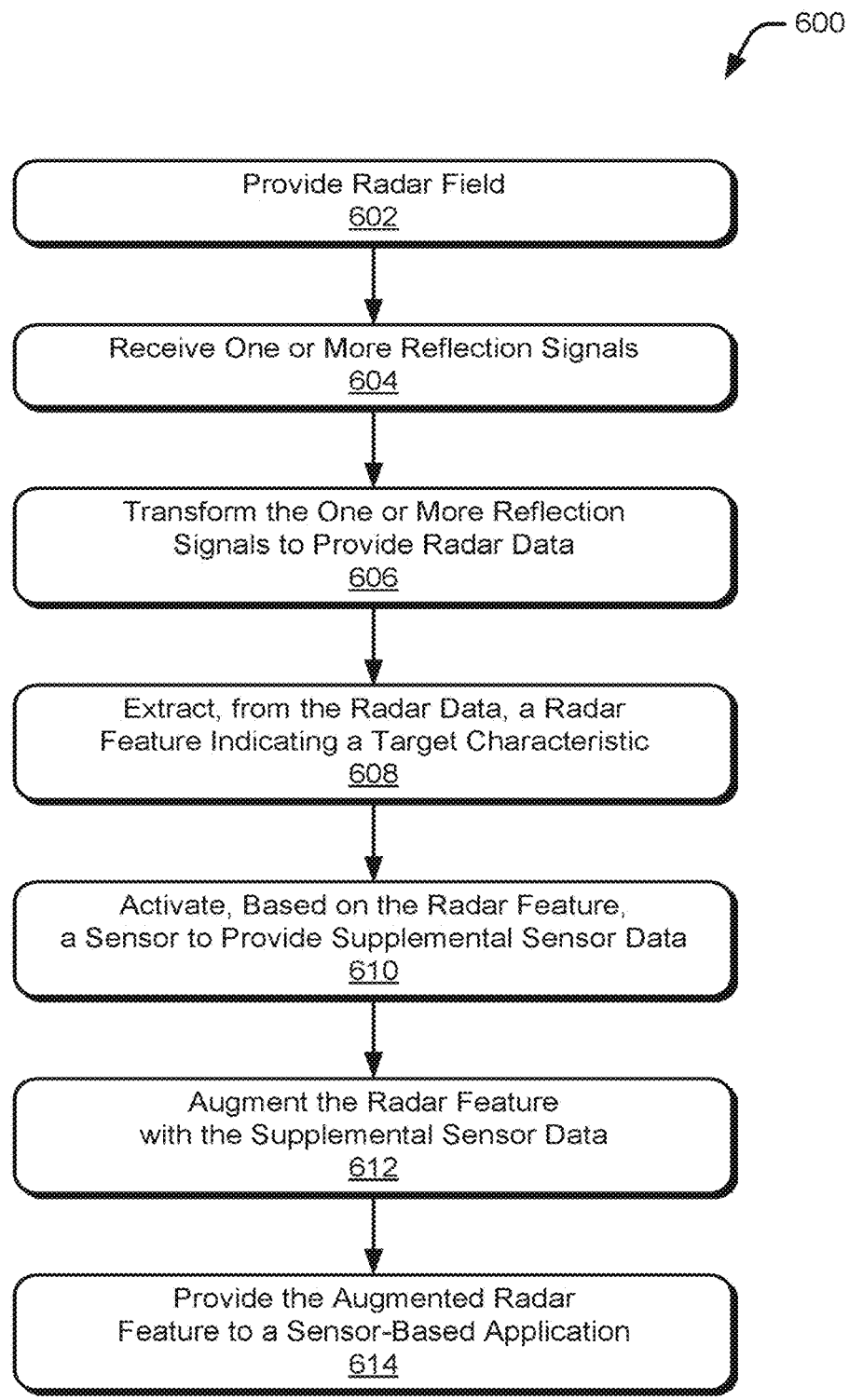
FIG. 6 illustrates an example method for augmenting radar data with supplemental sensor data.

FIG. 6 depicts an example method 600 for augmenting radar data with supplemental sensor data, including operations performed by the radar sensor 120, sensor fusion engine 110, or context manager 112.

At 602, a radar field is provided, such as one of the radar fields shown in FIG. 2 or 3. The radar field can be provided by a radar system or radar sensor, which may be implemented similar to or differently from the radar sensor 120 and radar-emitting element 122 of FIG. 1. The radar field provided may comprise a broad beam, full contiguous radar field or a directed narrow beam, scanned radar field. In some cases, the radar field is provided at a frequency approximate a 60 GHz band, such as 57-64 GHz or 59-61 GHz, though other frequency bands can be used.

Figure 7:
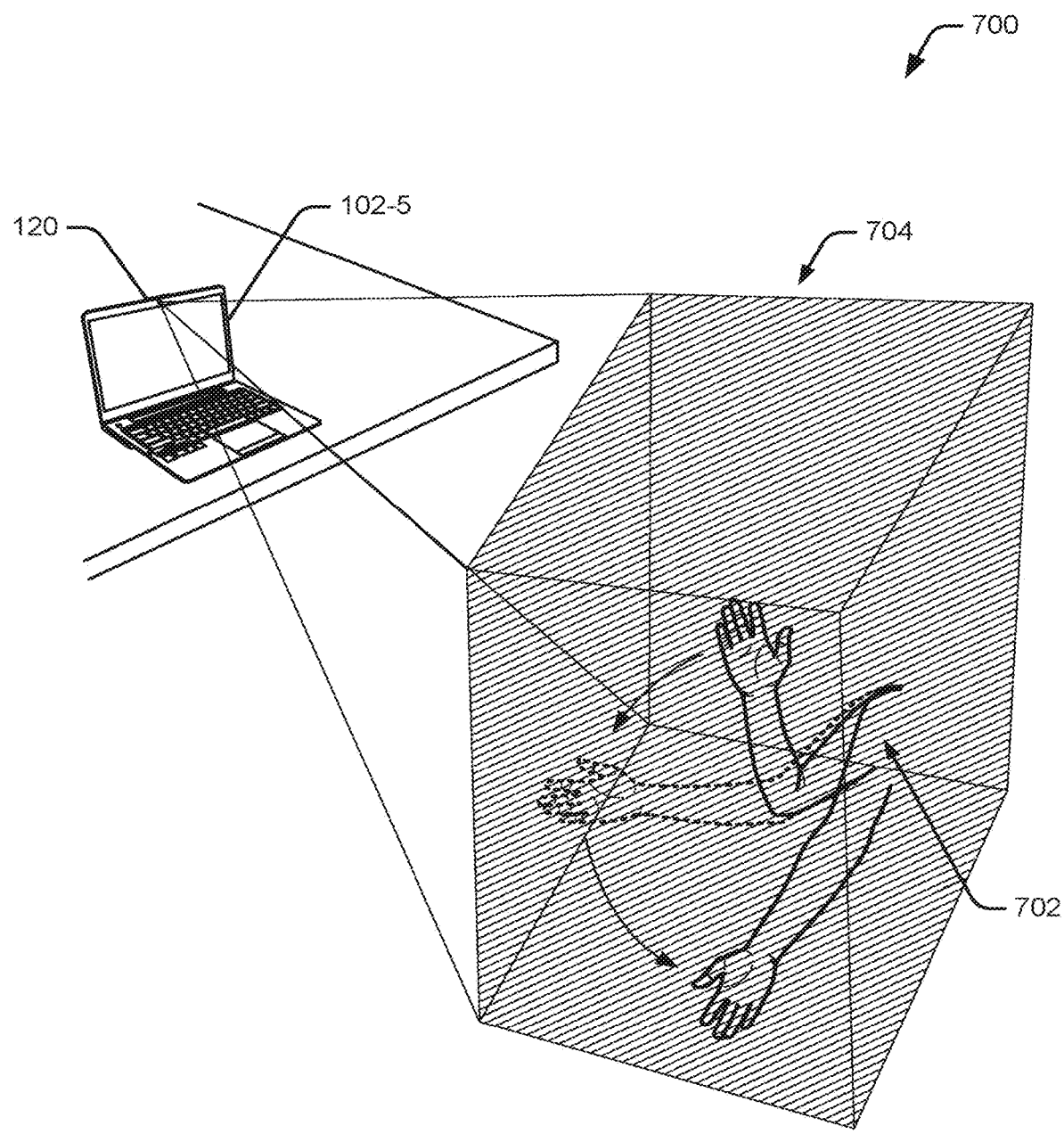
FIG. 7 illustrates an example of implementation of motion tracking with enhanced radar features.

By way of example, consider FIG. 7 in which a laptop computer 102-5 includes a radar sensor 120 at 700 and is capable of implementing radar-enabled sensor fusion. Here, assume that a user 702 is using a gesture driven control menu of the laptop 102-5 to play a first person shooter (FPS) video game. The radar sensor 120 provides radar field 704 to capture movement of the user 702 to enable game control.

At 604, one or more reflection signals are received that correspond to a target in the radar field. The radar reflection signals may be received as a superposition of multiple points of a target object in the radar field, such as a person or object within or passing through the radar field. In the context of the present example, reflection signals from the user's hand are received by the radar sensor 120.

At 606, the one or more reflection signals are transformed into radar data representations. The reflection signals may be transformed using any suitable signal processing, such as by performing a range-Doppler transform, range profile transform, micro-Doppler transform, I/Q transform, or spectrogram transform. Continuing the ongoing example, the radar sensor performs a range-Doppler transform to provide target velocity and direction information for the user's hand.

At 608, a radar feature indicative of a characteristic of the target is extracted from the radar data. The radar feature may provide a real-time measurement of the characteristic of the target, position of the target, or dynamics of the target. The radar feature may include any suitable type of feature, such as a detection feature, reflection feature, motion feature, position feature, or shape feature, examples of which are described herein. In the context of the present example, reflection radar features and motion radar features of the user's hand are extracted from the radar data.

At 610, a sensor is activated based on the radar feature. The sensor can be activated to provide supplemental data. In some cases, a sensor is selected for activation based on the radar feature or a type of the radar feature. For example, an RGB or infrared sensor can be activated to provide supplemental sensor data for a surface feature or motion feature. In other cases, an accelerometer or gyroscope can be activated to obtain supplemental data for a motion feature or position feature. In yet other cases, data may be received from a microphone or depth sensor to improve a detection feature. Continuing the ongoing example, the sensor fusion engine 110 activates the RGB sensor 220 of the laptop 102-5 to capture spatial information.

At 612, the radar feature is augmented with the supplemental sensor data. This may include combining, or fusing, the radar feature and sensor data to provide a more-accurate or more-precise radar feature. Augmenting the radar feature may include improving an accuracy or resolution of the radar feature based on supplemental or complimentary sensor data. Examples of this sensor fusion may include using sensor data to increase a positional accuracy of the radar feature, mitigate a false detection attributed to the radar feature, increase a spatial resolution of the radar feature, increase a surface resolution of the radar feature, or improve a classification precision of the radar feature. In the context of the present example, the sensor fusion engine 110 combines the motion radar features 516 and RGB information to provide sensor information that spatially captures a very fast movement. In some cases, the RGB sensor 220 would not be able to detect or capture such motion due to inherent limitations of the sensor.

At 614, the augmented radar feature is provided to a sensor-based application. This can be effective to increase performance of the sensor-based application. In some cases, the augmented radar feature increases accuracy of detection applications, such as proximity detection, user detection, activity detection, gesture detection, and the like. In such cases, sensor data may be used to eliminate false detection, such as by confirming or disproving detection of the target. In other cases, the augmented radar feature may improve consistency of the application. Concluding the present example, the fused radar data features are passed to the gesture detection application 534, which passes a gesture to the FPS video game as game control input.

Figure 8:
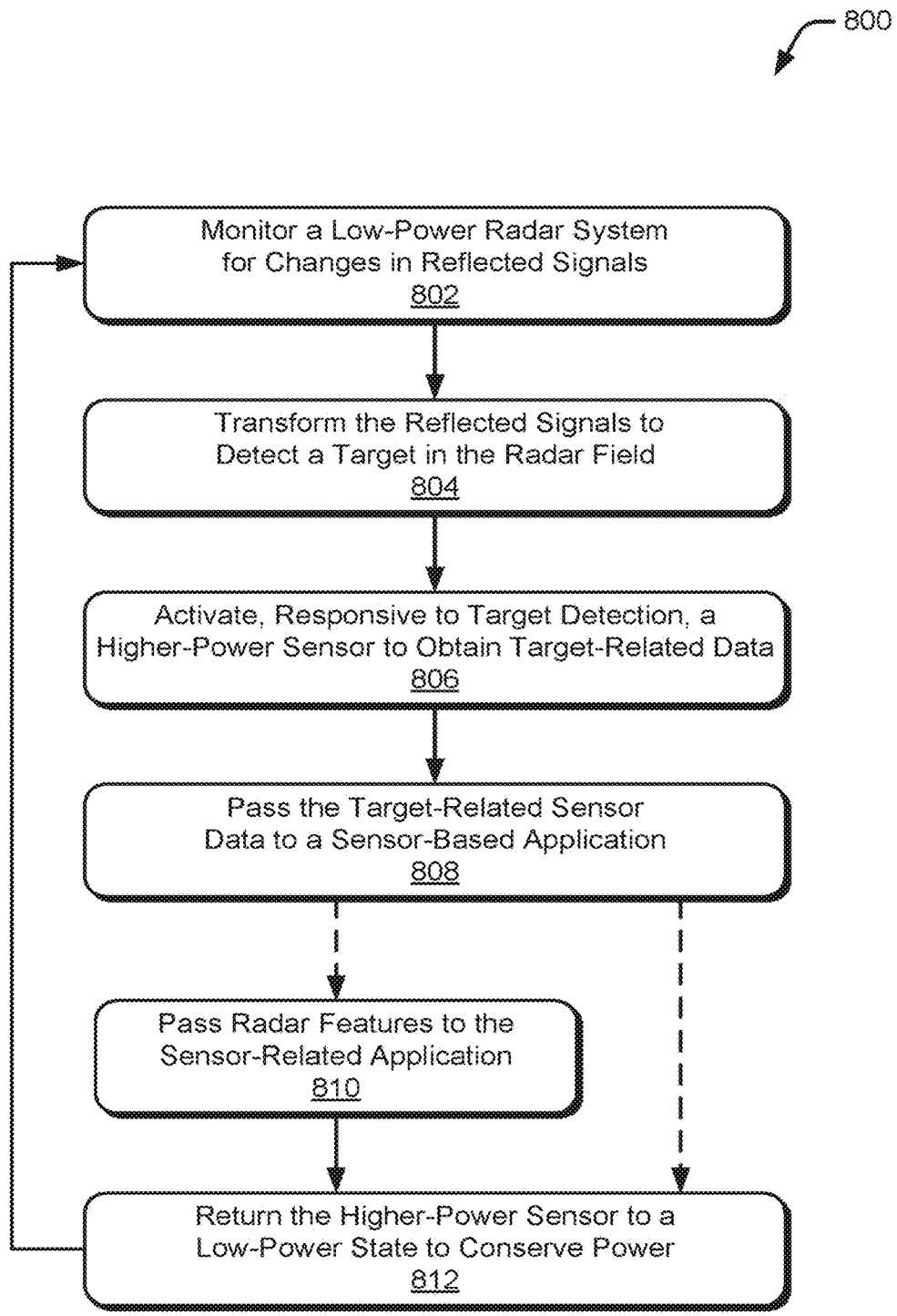
FIG. 8 illustrates an example method for low-power sensor fusion in accordance with one or more embodiments.

FIG. 8 illustrates an example method for low-power sensor fusion, including operations performed by the radar sensor 120, sensor fusion engine 110, or context manager 112.

Figure 9:
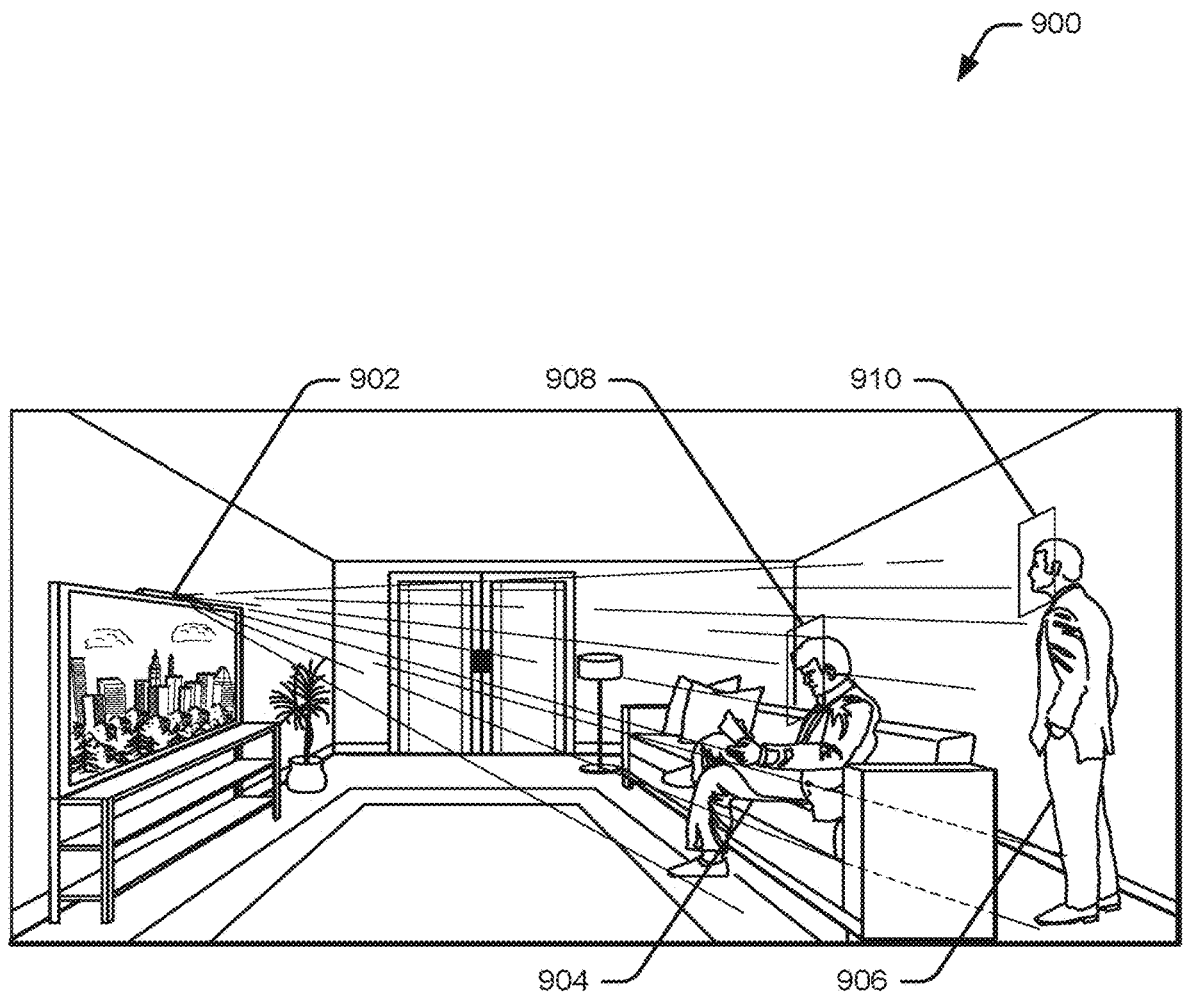
FIG. 9 illustrates an example of low-power sensor fusion implemented by smart-television that includes a sensor fusion engine.

At 802, a radar sensor of a device is monitored for changes in reflected signals of a radar field. The radar sensor may provide a continuous or intermittent radar field from which the reflected signals are received. In some cases, the radar sensor is a lower-power sensor of a device, which consumes less power while operating than other sensors of the device. The changes in the reflected signals may be caused by movement of the device or movement of a target within the device's environment. By way of example, consider environment 900 of FIG. 9 in which a radar-enabled television 902 is being watched by a first user 904 in a living room. Here, assume that user 904 begins reading a magazine and that a second user 906 enters the living room. A radar sensor 120 of the television detects changes in reflected radar signals caused by these actions of the first and second users.

At 804, the reflected signals are transformed to detect a target in the radar field. In some cases, detection features are extracted from the transformed radar data to confirm detection of the target in the radar field. In other cases, shape features or motion features are extracted from the transformed radar data to identity physical characteristics the target or movement of the target in the radar field. In the context of the present example, detection radar features for the first and second users are extracted from the reflected radar signals.

At 806, responsive to detection of the target in the reflected signals, a higher-power sensor is activated from a low-power state to obtain target-related sensor data. For example, if a radar detection feature indicates movement or presence of a user in the radar field, an RGB sensor can be activated to capture imagery of the user. In other cases, a GPS module of the device may be activated in response to position radar features or reflection radar features that indicate the device is moving. Continuing the ongoing example, the sensor fusion engine 110 activates the RGB sensor 220 of the television 902. The RGB sensor 220 obtains face image data 908 of the first user 904 and face image data 910 of the second user 906. This image data may be static images or video of the user's faces, such as to enable eye tracking or other dynamic facial recognition features.

At 808, the target-related sensor data is passed to a sensor-based application. The sensor-based application may include any suitable application, such as those described herein. In some cases, execution of the sensor-based application is initiated or resumed in response to detecting a particular activity or target in the radar field. For example, a surveillance application may be resumed in response to sensing activity features that indicate an unauthorized person entering a controlled area. An RGB sensor can then pass image data to the surveillance application. In the context of the present example in FIG. 9, the RGB sensor passes the face image data 908 and face image data 910 to a biometric recognition application 528.

Optionally at 810, radar features extracted from the transformed radar data are passed to the sensor-based application. In some cases, the radar features provide additional context for the sensor data passed to the sensor-based application. For example, a position radar feature can be passed to an application receiving RGB imagery to enable the application to tag targets in the imagery with respective location information.

Continuing the ongoing example, the sensor fusion engine 110 passes respective radar surface features of the user's faces to the biometric recognition application 528. Here, the application may determine that the first user 904 is not watching the television (e.g., eye tracking), and determine that the second user 906 is interested in watching the television 902. Using the face image data 910, the sensor fusion engine 110 can identify the second user 906 and retrieve, based on his identity, a viewing history associated with this identity. The context manager 112 leverages this viewing history to change a channel of the television to a last channel viewed by the second user 906.

At 812, the higher-power sensor is returned to a low-power state. Once the sensor data is passed to the sensor-based application, the higher-power sensor can be returned to the low-power state to conserve power of the device. Because the radar sensor consumes relatively little power while providing an array of capabilities, the other sensors can be left in low-power states until more sensor-specific data needs to be obtained. By so doing, power consumption of the device can be reduced, which is effective to increase run times for battery operated devices. From operation 812, the method 800 may return to operation 802 to monitor the radar sensor for subsequent changes in the reflected signals of the radar field. Concluding the present example, the RGB sensor 220 is returned to a low-power state after changing the channel of the television and may reside in the low-power state until further activity is detected by the radar sensor 120.

Figure 10:
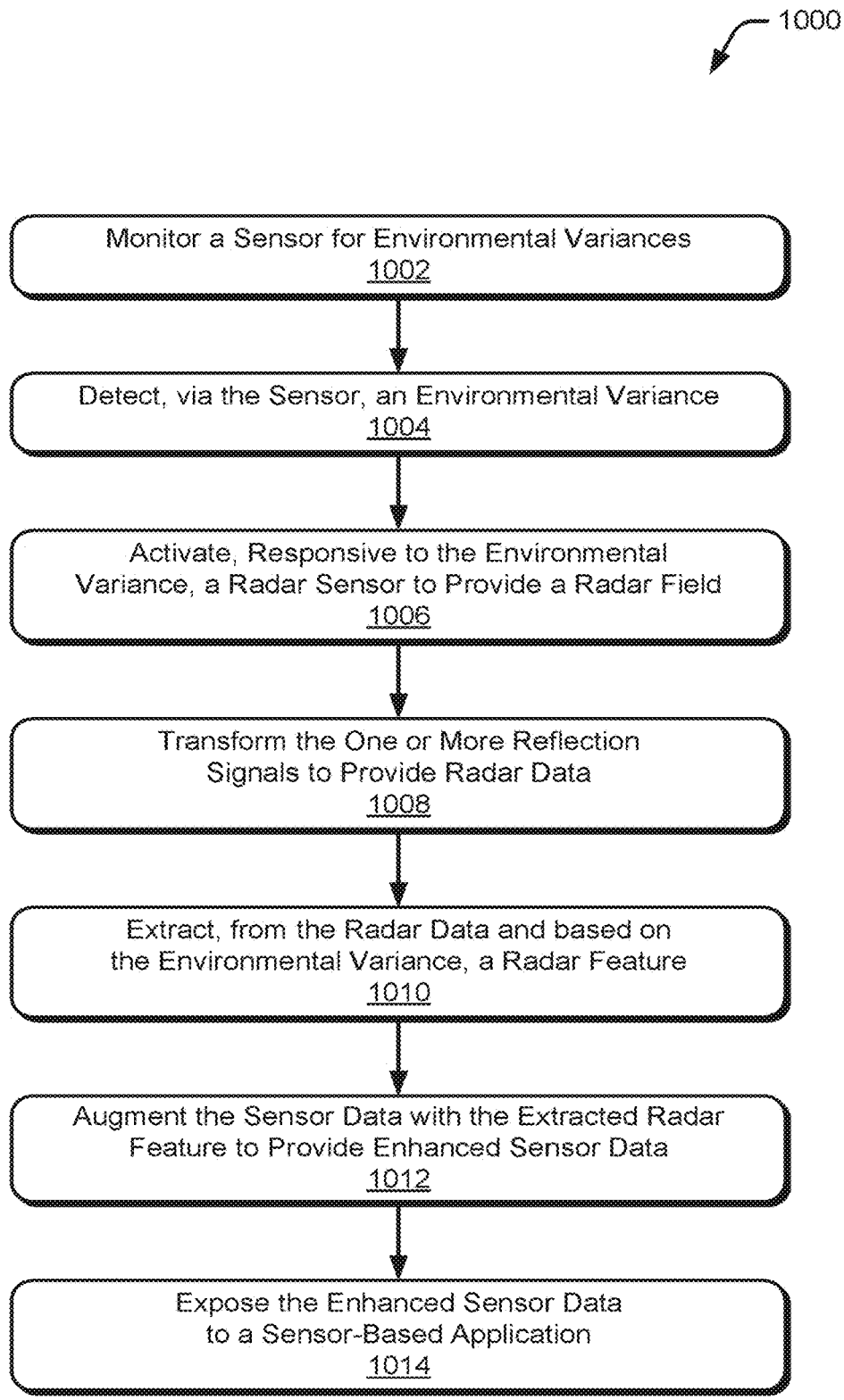
FIG. 10 illustrates an example method for verifying a radar feature with complimentary sensor data.

FIG. 10 illustrates an example method for enhancing sensor data with radar features, including operations performed by the radar sensor 120, sensor fusion engine 110, or context manager 112.

At 1002, a sensor of a device is monitored for environmental variances. The sensor may include any suitable type of sensor, such as those described in reference to FIG. 2 and elsewhere herein. The sensors may be configured to monitor variances of a physical state of the device, such as device motion, or variance remote from the device, such as ambient noise or light. In some cases, the sensor is monitored while the device is in a low-power state or by a low-power processor of the device to conserve device power.

At 1004, an environmental variance is detected via the sensor. The environmental variance may include any suitable type of variance, such as a user's voice, ambient noise, device motion, user proximity, temperature change, change in ambient light, and so on. The detected environmental variance may be associated with a particular context, activity, user, and the like. For example, the environmental variance may include a voice command from a user to wake the device from a sleep state and unlock the device for use.

At 1006, responsive to detecting the environmental variance, a radar sensor is activated to provide a radar field. The radar sensor of the device may be activated to provide radar data that is supplemental or complimentary to data provided by the sensor. In some cases, the radar field is configured based on a type of sensor that detects the environmental variance or sensor data that characterizes the environmental variance. For example, if user proximity is detected, the radar sensor is configured to provide a short-range radar field suitable for identifying the user. In other cases, the radar sensor can be configured to provide a sweeping long-range radar field in response to detecting ambient noise or vibrations. In such cases, the long-range radar field can be used to detect activity or a location associated with the source of the noise.

At 1008, reflection signals from the radar field are transformed to provide radar data. The reflection signals may be transformed using any suitable signal processing, such as by performing a range-Doppler transform, range profile transform, micro-Doppler transform, I/Q transform, or spectrogram transform. In some cases, a type of transform used to provide the radar data is selected based on a type of sensor that detects the environmental variance or the data provided by the sensor.

At 1010, a radar feature is extracted from the radar data. The radar feature can be extracted based on the environmental variance. In some cases, a type of radar feature is selected based on the environmental variance or a type of the environmental variance. For example, a detection feature or motion feature can be selected in response to an acoustic sensor detecting ambient noise. In other cases, the radar sensor can extract a position feature or shape feature in response to an accelerometer sensing movement of the device.

At 1012, the sensor data is augmented with the radar feature to provide enhanced sensor data. This can be effective to increase an accuracy or confidence rate associated with the sensor data. In other words, if the sensor has a weakness with respect to accuracy, range, or another measurement, the radar data may compensate for this shortcomings and improve the quality of the sensor data. For example, a surface feature of a user's face may confirm an identity of the user and a validity of a voice command received to unlock the device.

At 1014, the enhanced sensor data is exposed to a sensor-based application. This can be effective to improve performance of the sensor-based application by improving an accuracy of the application, reducing an amount of sensor data used by the application, expanding functionality of the application, and the like. For example, a motion-based power state application that awakes the device in response to movement may also authenticate a user and unlock the device based on enhanced sensor data that includes motion data and a surface feature of the user's facial structure.

Figure 11:
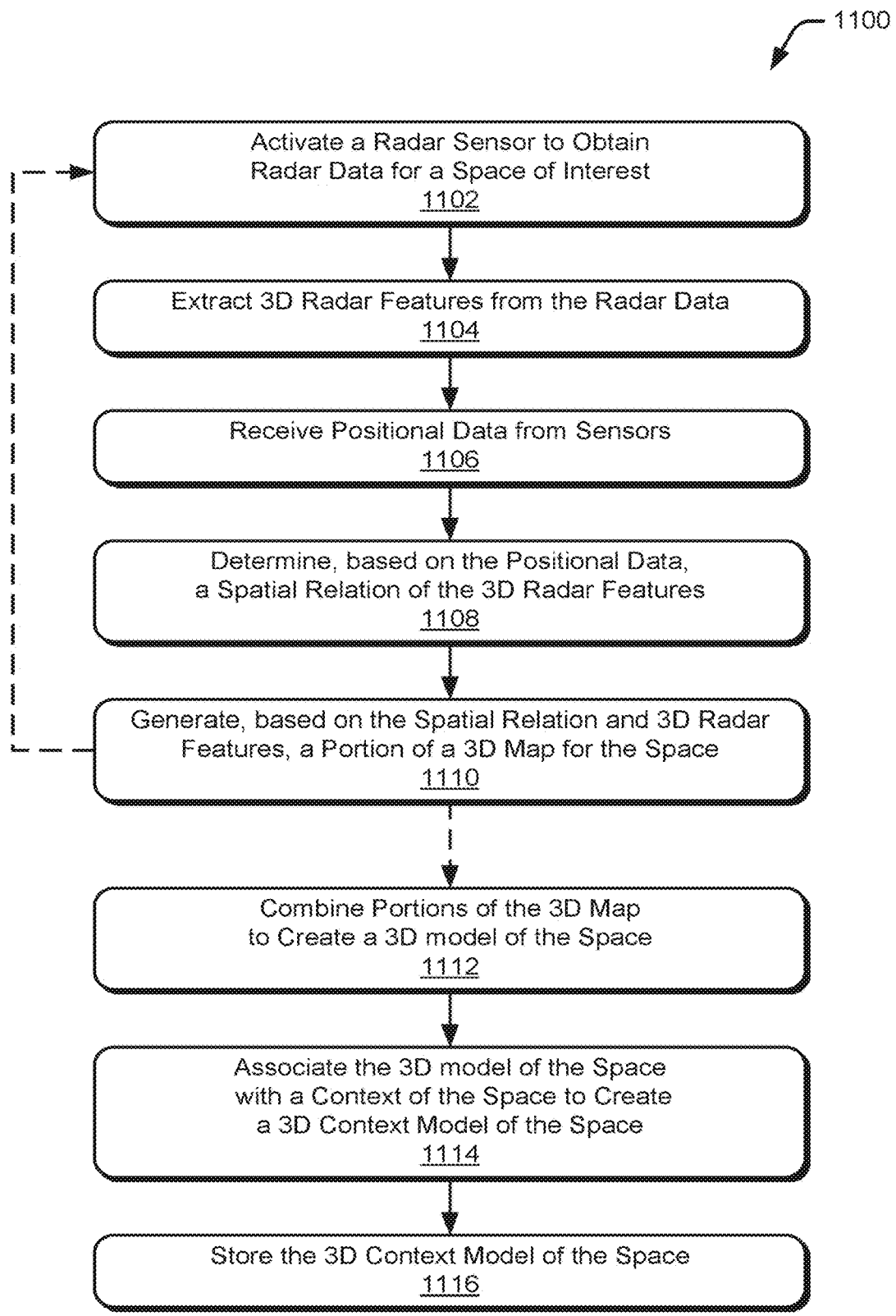
FIG. 11 illustrates an example method for generating a context model for a space of interest.

FIG. 11 illustrates an example method for creating a 3D context model for a space of interest, including operations performed by the radar sensor 120, sensor fusion engine 110, or context manager 112.

At 1102, a radar sensor of a device is activated to obtain radar data for a space or area of interest. The radar sensor may be activated responsive to movement of the device, such as inertial data or GPS data indicating that the device is moving into the space or area. In some cases, the radar sensor is activated responsive to detecting unknown devices, such as wireless access points, wireless appliances, or other wireless devices in the space transmitting data detectable by a wireless interface of the device.

Figure 12:
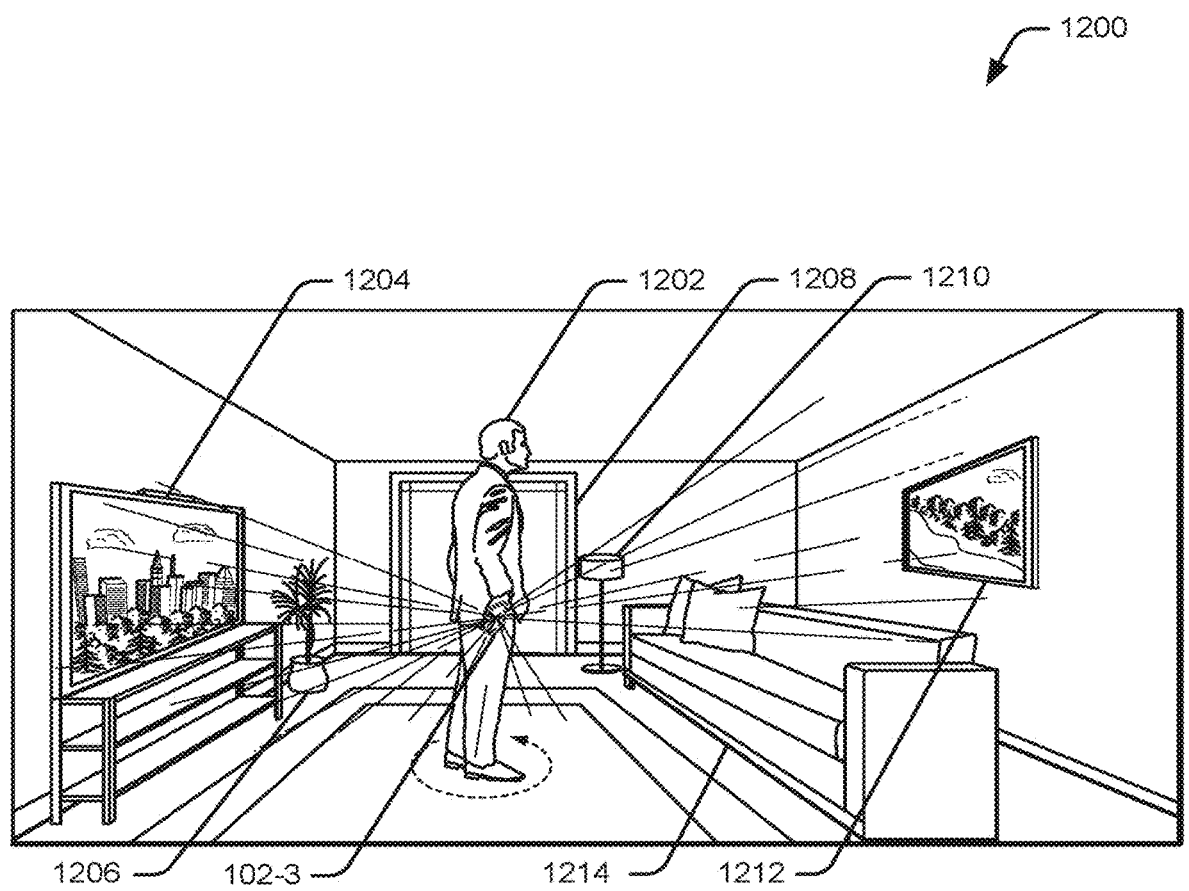
FIG. 12 illustrates an example of a room being contextually mapped in accordance with one or more embodiments.

By way of example, consider environment 1200 of FIG. 12 in which a user 1202 has entered a living room with his smart-phone 102-3 in his pocket. Here, assume that the user 1202 has not been in this space before and therefore the smart-phone 102-2 has no previous context information associated with this space. Responsive to sensing an open area or wireless data transmissions of a television 1204, a radar sensor 120 of the smart-phone 102-3 begins scanning, through the radar-transparent pocket material, the room and obtaining radar data. As the user changes orientation in the room, the radar sensor 120 continues to scan the room to obtain additional radar data.

At 1104, 3D radar features are extracted from the radar data. The 3D radar features may include 3D radar features or a combination of 1D and 2D features that are useful to construct 3D radar features. The 3D radar features may include radar reflection features, motion features, or shape features that capture physical aspects of the space or area of interest. For example, the 3D radar features may include ranging, position, or shape information for targets in the space, such as furniture, walls, appliances, floor coverings, architectural features, and the like. In the context of the present example, the context manager 112 extracts position and surface radar features of targets in the room, such as the television 1204, plant 1206, door 1208, lamp 1210, picture 1212, and sofa 1214. The radar shapes may indicate an approximate shape, surface texture, or position (absolute or relative to other targets) of each target in the room.

At 1106, positional data is received from sensors of the device. The positional data may include orientation data, inertial data, motion data, directional data, and the like. In some cases, the positional data is useful to implement synthetic aperture techniques for radar scanning or radar imaging. Alternately or additionally, other sensors of the device can provide data indicative of the environment of the space. For example, an acoustic sensor may provide data useful to identify an ambient noise (e.g., fan noise or machinery hum) present in the space. Continuing the ongoing example, an accelerometer 202 of the smart-phone 102-3 provides inertial and orientation data to the sensor fusion engine 110 as the user moves throughout the room.

At 1108, a spatial relation of the 3D radar features is determined based on the positional data. As noted, the positional data can be leveraged to provide a synthetic aperture through which the radar sensor can scan the area of interest. In other words, as a device moves through a space, the radar sensor can capture physical characteristics of the room as multiple 3D radar features. The positional data received from the sensor can then be used to determine spatial relations between the multiple 3D features or how these features fit together in a 3D space. In the context of the present example, the context manager 112 determines spatial relations between the targets in room by using the inertial and orientation data of the accelerometer 202.

At 1110, a portion of a 3D map is generated based on the 3D radar features and spatial relations thereof. A 3D map can be generated for a portion of the space or room based on landmarks captured by the radar features. These landmarks may include identifiable physical characteristics of the space, such as furniture, basic shape and geometry of the space, reflectivity of surfaces, and the like. From operation 1110, the method 1100 may return to operation 1102 to generate another portion of the 3D map of the space or proceed to operation 1112. Continuing the ongoing example and assuming the sensor fusion engine has scanned most of the room, the context manager 112 generates multiple portions of a 3D map of the room based on the radar features of the targets 1204 through 1214 in the room and/or overall dimensions of the room.

At 1112, the portions of the 3D map are combined to create a 3D model of the space. In some cases, the portions of the 3D map may be assembled or meshed by overlapping respective edges. In other cases, the portions of the 3D map are combined based on the previously obtained positional data. The 3D map of the space may be complete or partial depending on a number of viable 3D radar features extracted from the radar data. In the context of the present example, the context manager 112 meshes the previously generated portions to provide a 3D model of the living room.

At 1114, the 3D model of the space is associated with a context of the space. This can be effective to create a 3D context model of the space. The context can be any suitable type of context, such as a type of room, a security level, privacy level, device operating mode, and the like. In some cases, the context is user defined, which may include prompting the user to select from a list of predefined contexts. In other cases, machine learning tools may implement the mapping operations and assign a context based on physical characteristics of the space. Continuing the ongoing example, the context manager 112 associates, based on the presence of the television 1204 and sofa 1214, a "living room" context to the space. This context indicates that the area is private, security risks are low, and that television 1204 is media capable and can be controlled through wireless or gesture-driven control functions. For instance, media playback on the smart-phone 102-3 may be transferred to the television 1204 upon entry into the living room.

At 1116, the 3D context model of the space is stored by the device. The 3D context model can be stored to local memory or uploaded to the Cloud to enable access by the device or other devices. In some cases, storing the 3D context model enables subsequent identification of the space via the radar sensor. For example, the device may maintain a library of 3D context models that enables the device to learn and remember spaces and contexts associated therewith. Concluding the present example, the context manager 112 stores the 3D context model of the living room to enable subsequent access and device configuration, an example of which is described herein.

Figure 13:
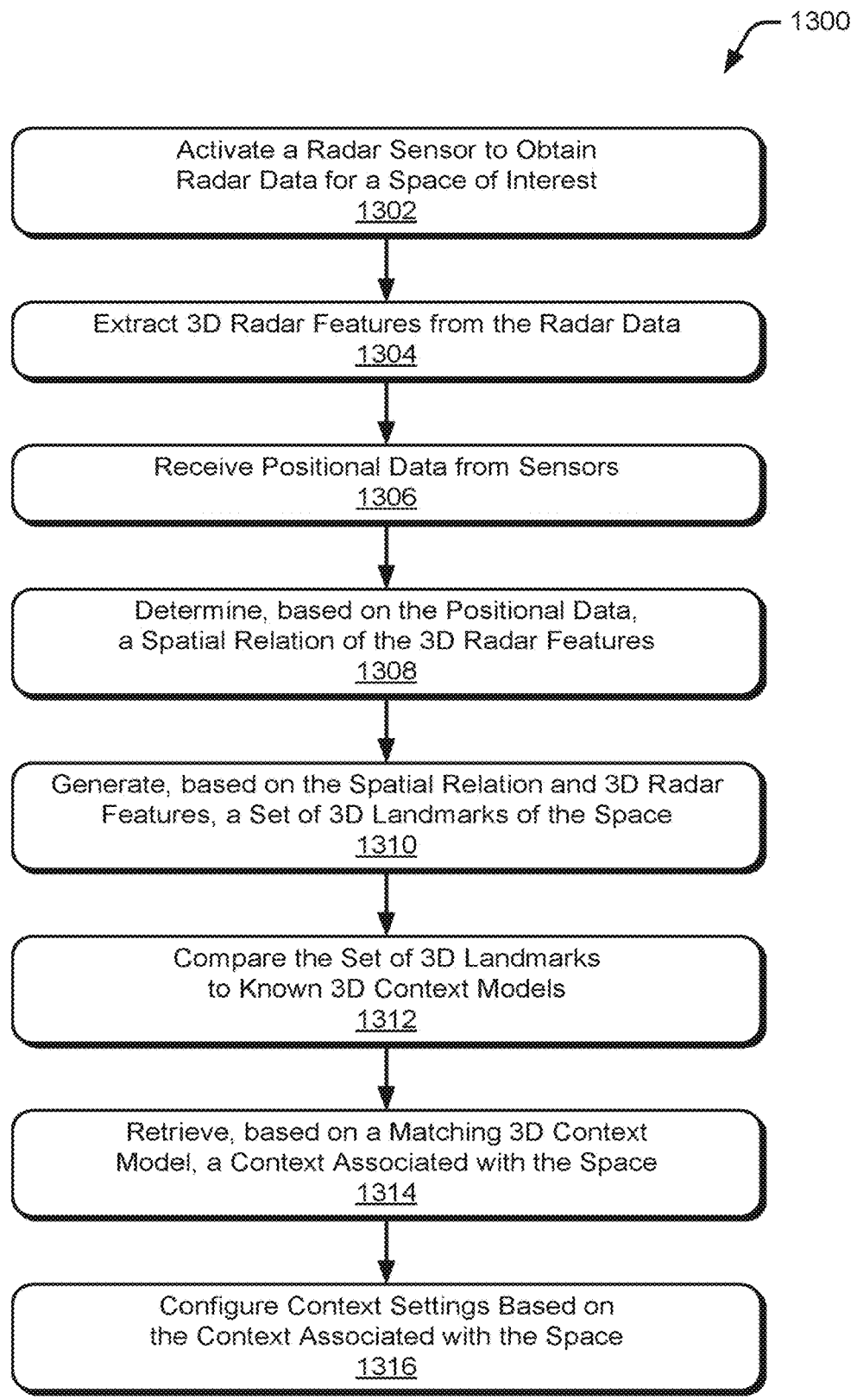
FIG. 13 illustrates an example method for configuring context settings based on a context associated with a space

FIG. 13 illustrates an example method for configuring context settings of a device based on a 3D context model, including operations performed by the radar sensor 120, sensor fusion engine 110, or context manager 112.

At 1302, a radar sensor of a device is activated to obtain radar data for a space or area of interest. The radar sensor may be activated responsive to movement of the device, such as inertial data or GPS data indicating that the device is moving into the space or area. In some cases, the radar sensor is activated responsive to detecting known devices, such as wireless access points, wireless appliances, or other wireless devices in the space with which the device has previously been associated.

At 1304, 3D radar features are extracted from the radar data. The 3D radar features may include 3D radar features or a combination of 1D and 2D features that are useful to construct 3D radar features. The 3D radar features may include radar reflection features, motion features, or shape features that capture physical aspects of the space or area of interest. For example, the 3D radar features may include ranging, position, or shape information for targets in the space, such as furniture, walls, appliances, floor coverings, architectural features, and the like.

At 1306, positional data is received from sensors of the device. The positional data may include orientation data, inertial data, motion data, directional data, and the like. In some cases, the positional data is useful to implement synthetic aperture techniques for radar scanning or radar imaging. Alternately or additionally, other sensors of the device can provide data indicative of the environment of the space. For example, an acoustic sensor may provide data useful to identify an ambient noise (e.g., fan noise or machinery hum) present in the space.

At 1308, a spatial relation of the 3D radar features is determined based on the positional data provided by the sensors. As noted, the positional data can be leveraged to provide a synthetic aperture through which the radar sensor can scan the area of interest. In other words, as a device moves through a space, the radar sensor can capture physical characteristics of the room as multiple 3D radar features. The positional data received from the sensor can then be used to determine spatial relations between the multiple 3D features or how these features fit together in a 3D space.

At 1310, a set of 3D landmarks of the space is generated based on the 3D radar features and the spatial orientation thereof. These landmarks may include identifiable physical characteristics of the space, such as furniture, basic shape and geometry of the space, reflectivity of surfaces, and the like. For example, 3D landmarks of a conference room may include a table having legs of a particular shape and an overhead projector mounted to a mast that protrudes from the ceiling.

At 1312, the set of 3D landmarks is compared to known 3D context models. This can be effective to identify the space in which the device is operating based on a known 3D context model. In some cases, a match to a known 3D context model is determined when the set of the 3D landmarks correspond to those of the 3D context model. To account for variability over time, such as moving or replacing furniture, a match may be determined when enough of the 3D landmarks match to meet a predefined confidence threshold. In such cases, static 3D landmarks, which may include room geometry and fixed architecture (e.g., staircases), can be weighted heavier to minimize an effect that dynamic landmarks have on model matching rates.

At 1314, a context associated with the space is retrieved based on the matching 3D context model. Once a match for the space is determined, a context to apply to the device can be retrieved or accessed by the device. The context may be any suitable type of context, such as a privacy, meeting, appointment, or security context. Alternately or additionally, if a context of the 3D context model is incompatible with current device settings or out-of-date, the user may be prompted to select a context, create a context, or update a context for the space.

At 1316, context settings are configured based on the context associated with the space. The context settings configured may include any suitable type of setting, such as ringer volume, ringer mode, display modes, connectivity to networks or other devices, and the like. Further, security settings or privacy settings, of the device can be configured to enable or limit the display of secure or private content.

Figure 14:
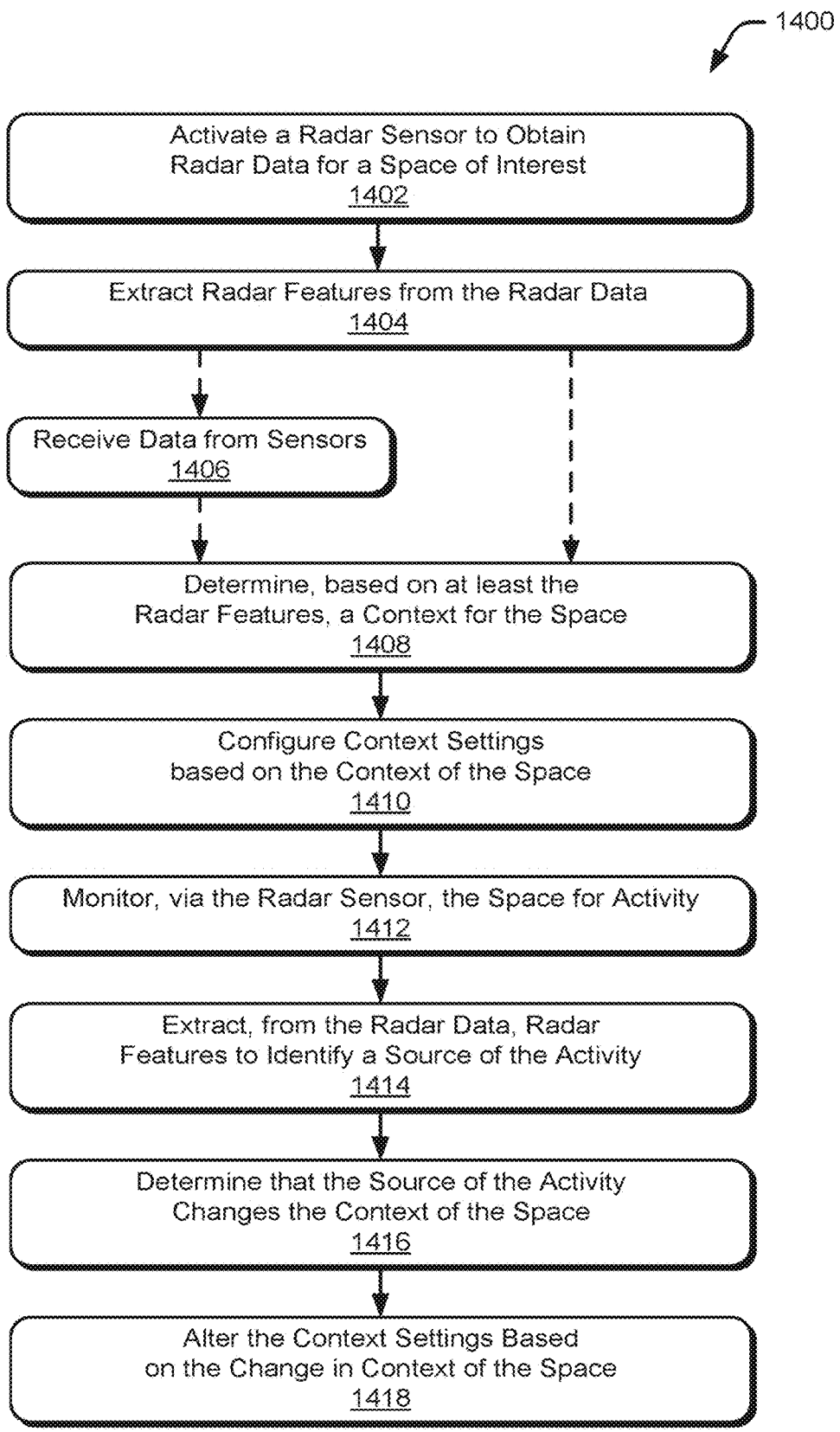
FIG. 14 illustrates an example method of changing contextual settings in response to a context of a space being altered.

FIG. 14 illustrates an example method for altering context settings in response to a change in context, including operations performed by the radar sensor 120, sensor fusion engine 110, or context manager 112.

Figure 15:
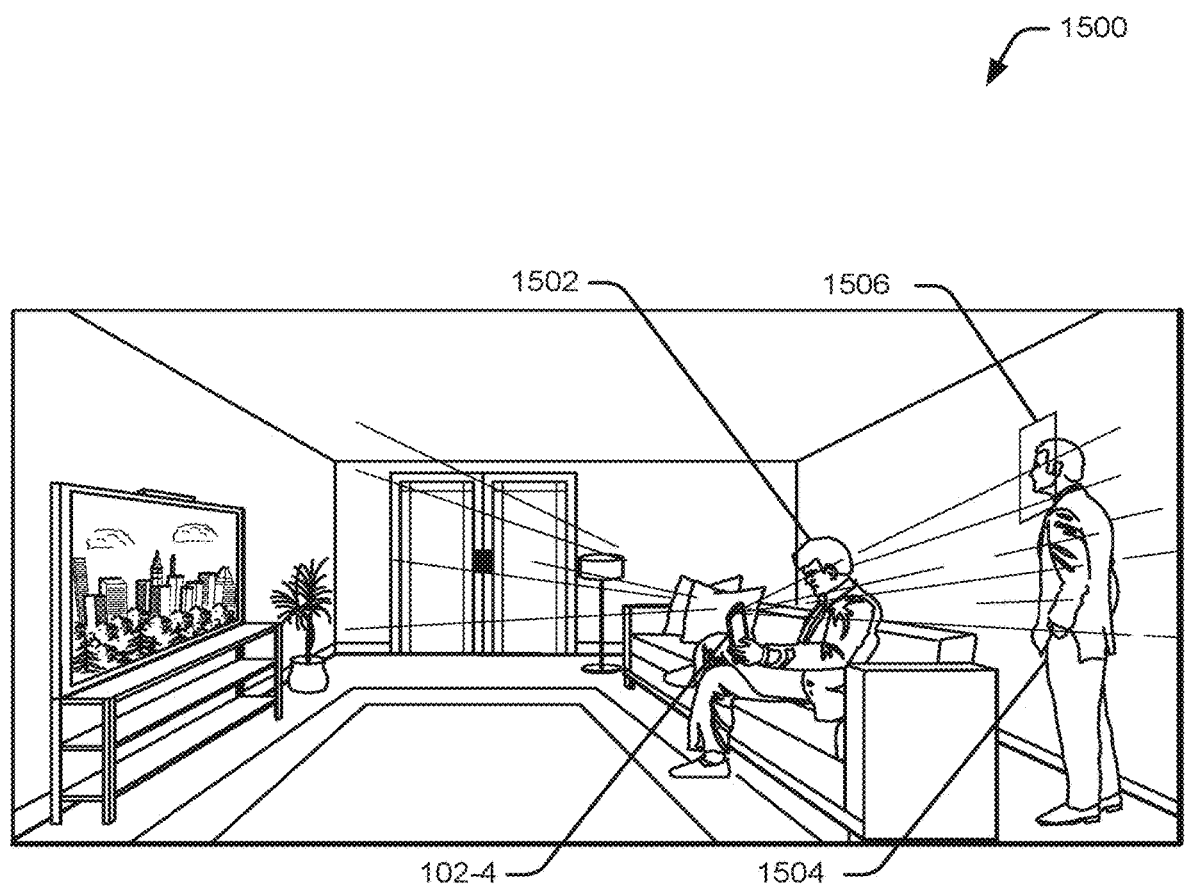
FIG. 15 illustrates an example of changing contextual settings of a computing device in response to a change in context.

At 1402, a radar sensor of a device is activated to obtain radar data for an area of interest. The radar sensor may emit a continuous or directional radar field from which signals are reflected by targets in the area. The targets in the area may include any suitable type of object, such as walls, furniture, windows, floor coverings, appliances, room geometry, and the like. By way of example, consider environment 1500 of FIG. 15 in which a user 1502 is reading digital content displayed by a tablet computer 102-4. Here, context manager 112 activates a radar sensor 120 of the tablet computer 102-4 to obtain radar data for the room in which the table computer is operating.

At 1404, radar features are extracted from the radar data. The 3D radar features may include 3D radar features or a combination of 1D and 2D features that are useful to construct 3D radar features. The 3D radar features may include radar reflection features, motion features, or shape features that capture physical aspects of the space or area of interest. For example, the 3D radar features may include ranging, position, or shape information for targets in the space. In the context of the present example, a sensor fusion engine 110 of the tablet computer 102-4 extracts radar features useful to identify targets within and a geometry of the living room of environment 1500.

Optionally at 1406, data is received from a sensor of the device. In some cases, sensor data is useful to determine context for a space. For example, an acoustic sensor may provide data associated with an identifiable ambient noise in the space, such as running water of a fountain or a specific frequency of fan noise. In other cases, appliances or electronic devices may emit a particular whine, hum, or ultrasonic noise that can be detected by the acoustic sensors to provide identification data for a particular space.

At 1408, a context for the space is determined based on at least the radar features. In some cases, the context for the device is determined based on geometries and occupancies derived from the radar features. For example, the context manager may determine a size of the space, number of other occupants, and distances to those occupants in order to set a privacy bubble around the device. In other cases, a set of landmarks in the radar features is compared to known 3D context models. This can be effective to identify the space in which the device is operating based on a known 3D context model.

Although described as known, the 3D context models may also be accessed or downloaded to the device, such as based on device location (e.g., GPS). Alternately or additionally, other types of sensor data can be compared with that of known 3D context models. For example, sounds and wireless networks detected by the device can be compared to acoustic and network data of the known 3D context models. Continuing the ongoing example, the context manager 112 of the tablet computer 102-4 determines a context of environment 1500 as "living room," a private, semi-secure context.

At 1410, context settings of the device are configured based on the determined context. The context settings configured may include any suitable type of setting, such as ringer volume, ringer mode, display modes, connectivity to networks or other devices, and the like. Further, security settings or privacy settings of the device can be configured to enable or limit the display of secure or private content. In the context of the present example, assume that before an unknown person 1504 enters the room, the context manager 112 configures display, security, and alerts settings of the tablet computer 102-4 for a private context in which these settings are fully enabled or open.

At 1412, the space is monitored for activity via the radar sensor. The radar sensor may provide a continuous or intermittent radar field from which the reflected signals are received. In some cases, the radar sensor detects activity or targets in the radar field responsive to changes in the reflected signals. Continuing the ongoing example, the radar sensor 120 monitors environment 1500 for any activity or detection events that may indicate a change in context.

At 1414, radar features are extracted from radar data to identify the source of the activity in the space. This may include extracting detection, motion, or shape radar features to identify targets in the space. In some cases, the source of activity is a target leaving the space, such as someone leaving a room. In other cases, the source of activity may include people or objects entering the space. In the context of the present example, assume that the unknown person 1504 enters the room and approaches the user 1502. In response to this, the radar sensor 120 provides detection and shape radar features 1506 to facilitate identification of the unknown person 1504.

At 1416, it is determined that the source of the activity changes the context of the space. In some cases, other people leaving a space increases user privacy or reduces noise constraints on a device, thus resulting in a more-open context. In other cases, people entering a space or moving closer to the device can decrease user privacy or increase security concerns for the device and user. With this reduction in privacy or increased need for security, the context of the device can become more private and security oriented. Continuing the ongoing example, shape radar features 1506 are used in an attempt identify, via facial recognition, the unknown person 1504. Here, assume that that facial recognition fails, and that the context manager 112 determines that the presence of an unknown entity changes the context of the space with respect to privacy and security.

At 1418, the context settings of the device are altered based on the change in context of the space. In response to the change in context, the context settings of the device can be altered to compensate for the context changes. When the context of the device increases in privacy or security, altering the context settings may include limiting content exposed by the device, such as by dimming a display, disabling particular applications, affecting display polarization, limiting wireless connectivity of the device, or reducing audio playback volume. Concluding the present example, in response to detecting a change in context, the context manager 112 increases privacy and security settings of the tablet computer 102-4, such as by closing secure applications, reducing volume of alerts and device audio, or reducing a font size of displayed content such that the unknown person would be unable to discern the tablet's content.

Example Computing System

Figure 16:
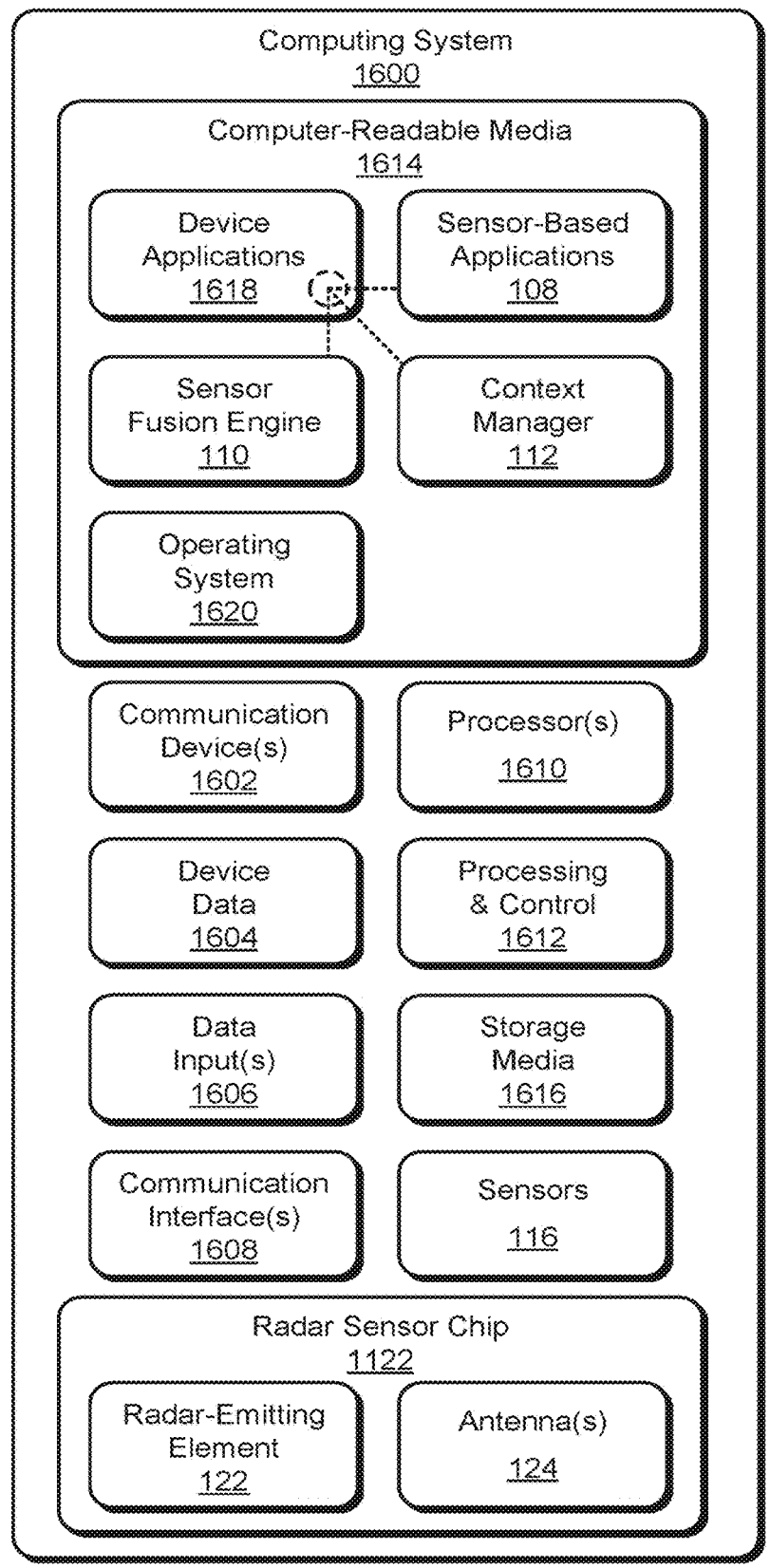
FIG. 16 illustrates an example computing system in which techniques of radar-enabled sensor fusion may be implemented.

FIG. 16 illustrates various components of an example computing system 1600 that can be implemented as any type of client, server, and/or computing device as described with reference to the previous FIGS. 1-15 to implement radar-enabled sensor fusion.

The computing system 1600 includes communication devices 1602 that enable wired and/or wireless communication of device data 1604 (e.g., received data, data that is being received, data scheduled for broadcast, data packets of the data, etc.). Device data 1604 or other device content can include configuration settings of the device, media content stored on the device, and/or information associated with a user of the device (e.g., an identity of an actor performing a gesture). Media content stored on the computing system 1600 can include any type of audio, video, and/or image data. The computing system 1600 includes one or more data inputs 1606 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 1600 also includes communication interfaces 1608, which can be implemented as any one or more of a serial and/or parallel interface, a wireless interface, any type of network interface, a modem, and as any other type of communication interface. Communication interfaces 1608 provide a connection and/or communication links between the computing system 1600 and a communication network by which other electronic, computing, and communication devices communicate data with the computing system 1600.

The computing system 1600 includes one or more processors 1610 (e.g., any of microprocessors, controllers, and the like), which process various computer-executable instructions to control the operation of the computing system 1600 and to enable techniques for, or in which can be embodied, radar-enabled sensor fusion. Alternatively or in addition, the computing system 1600 can be implemented with any one or combination of hardware, firmware, or fixed logic circuitry that is implemented in connection with processing and control circuits, which are generally identified at 1612. Although not shown, the computing system 1600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1600 also includes computer-readable media 1614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1600 can also include a mass storage media device (storage media) 1616.

The computer-readable media 1614 provides data storage mechanisms to store the device data 1604, as well as various device applications 1618 and any other types of information and/or data related to operational aspects of the computing system 1600. For example, an operating system 1620 can be maintained as a computer application with the computer-readable media 1614 and executed on the processors 1610. The device applications 1618 may include a device manager, such as any form of a control application, software application, signal-processing and control module, code that is native to a particular device, an abstraction module or gesture module and so on. The device applications 1618 also include system components, engines, or managers to implement radar-enabled sensor fusion, such as the sensor-based applications 108, sensor fusion engine 110, and context manager 112.

The computing system 1600 may also include, or have access to, one or more of radar systems or sensors, such as a radar sensor chip 1622 having the radar-emitting element 122, a radar-receiving element, and the antennas 124. While not shown, one or more elements of the sensor fusion engine 110 or context manager 112 may be implemented, in whole or in part, through hardware or firmware.

CONCLUSION

Although techniques using, and apparatuses including, radar-enabled sensor fusion have been described in language specific to features and/or methods, it is to be understood that the subject of the appended claims is not necessarily limited to the specific features or methods described. Rather, the specific features and methods are disclosed as example ways in which radar-enabled sensor fusion can be implemented.

We claim:

1. An apparatus comprising:
at least one computer processor;
at least one radar sensor comprising:
at least one radar-emitting element configured to provide radar fields; and
at least one radar-receiving element configured to receive radar reflection signals caused by reflections of the radar fields off objects within the radar fields;
a plurality of sensors, each of the sensors comprising a distinct type of sensor configured to sense a distinct type of environmental variance of the apparatus, the distinct type of environmental variance being remote from the apparatus and including at least one of a voice of a user of the apparatus, ambient noise, a temperature change, proximity of the user of the apparatus, or a change in ambient light; and
at least one computer-readable storage medium having instructions stored thereon that, responsive to execution by the computer processor, cause the apparatus to:
detect, via a sensor of the plurality of sensors, sensor data;
determine, based on the sensor data, the distinct type of environmental variance detected;
responsive to the determination of the distinct type of environmental variance detected, provide, via the radar-emitting element, a radar field, the radar field configured based on the distinct type of sensor that detected the distinct type of environmental variance and the distinct type of environmental variance detected;
receive, via the radar-receiving element, a reflection signal caused by a reflection of the radar field off an object within the radar field;
determine, based on the received reflection signal, a radar feature of the object, the radar feature comprising at least one of a radar detection feature, a radar reflection feature, a radar motion feature, a radar position feature, or a radar shape feature of the object;
augment the sensor data with the radar feature to enhance the sensor data; and
provide the enhanced sensor data to a sensor-based application effective to improve performance of the sensor-based application.

2. The apparatus of claim 1, wherein:
the instructions further cause the apparatus to determine, based on the received reflection signal, an indication of a number of targets, total reflected energy, moving energy, one-dimensional velocity, one-dimensional velocity dispersion, three-dimensional spatial coordinates, or one-dimensional spatial dispersion based on the reflection signal; and
the augmenting of the sensor data is based on the indication.

3. The apparatus of claim 1, wherein:
the instructions further cause the apparatus to perform, based on the distinct type of sensor or the distinct type of environmental variance detected, a range-Doppler transform, range profile transform, micro-Doppler transform, I/Q transform, or spectrogram transform on the reflection signal; and
the determination of the radar feature is further based on the performed transform.

4. The apparatus of claim 1, wherein the sensor-based application comprises proximity detection, user detection, user tracking, activity detection, facial recognition, breathing detection, or motion signature identification.

5. The apparatus of claim 1, wherein the sensors comprise two or more of an accelerometer, gyroscope, hall effect sensor, magnetometer, temperature sensor, microphone, capacitive sensor, proximity sensor, ambient light sensor, red-green-blue (RGB) image sensor, infrared sensor, or depth sensor.

6. The apparatus of claim 1, wherein augmenting the sensor data with the radar feature is effective to enhance the sensor data by:
increasing a positional accuracy of the sensor data;
mitigating a false-positive detection attributed to the sensor data; or
improving a classification precision of the sensor data.

7. The apparatus of claim 1, wherein the apparatus is in a low-power state until the detection of the sensor data.

8. The apparatus of claim 1, wherein the apparatus is embodied as a smart-phone, smart-glasses, smart-watch, tablet computer, laptop computer, set-top box, smart-appliance, home automation controller, or television.

9. The apparatus of claim 1, wherein:
the radar-receiving element comprises a plurality of antennas; and
the instructions further cause the apparatus to receive the reflection signal, via the antennas, using beamforming techniques.

10. A method comprising:
monitoring a plurality of sensors for environmental variances, each of the sensors comprising a distinct type of sensor configured to sense a distinct type of environmental variance, the distinct type of environmental variance being remote from a device and including at least one of a voice of a user of the device, ambient noise, a temperature change, proximity of the user of the device, or a change in ambient light;
detecting, via the sensor, sensor data;
determining, based on the sensor data, the distinct type of environmental variance detected;
responsive to determining the distinct type of environmental variance detected, providing, via at least one radar-emitting element of the device, a radar field, the radar field configured based on the distinct type of sensor that detected the distinct type environmental variance and the distinct type of environmental variance detected;
receiving, via at least one radar-receiving element of the device, a reflection signal caused by a reflection of the radar field off a target within the radar field;
determining, from the reflection signal, a radar feature that indicates a physical characteristic of the target;
augmenting the sensor data with the radar feature; and
providing the augmented sensor data to a sensor-based application.

11. The method of claim 10, wherein the distinct type of environmental variance is associated with at least one of a particular context, activity, or user of the device.

12. The method of claim 10, wherein the radar feature comprises a surface feature, a motion feature, a position feature, a reflection feature, a shape feature, or a detection feature.

13. The method of claim 10, wherein the sensor comprises an accelerometer, gyroscope, hall effect sensor, magnetometer, temperature sensor, microphone, capacitive sensor, proximity sensor, ambient light sensor, red-green-blue (RGB) image sensor, infrared sensor, or depth sensor.

14. The method of claim 10, wherein the radar feature indicates a number of targets in the radar field, total reflected energy, moving energy, one-dimensional velocity, one-dimensional velocity dispersion, three-dimensional spatial coordinates, or one-dimensional spatial dispersion.

15. At least one computer-readable storage media device comprising instructions that, when executed by a processing system, cause the processing system to:
monitor a plurality of sensors for environmental variances, each of the sensors comprising a distinct type of sensor configured to sense a distinct type of environmental variance, the distinct type of environmental variance being remote from an apparatus and including at least one of a voice of a user of the apparatus, ambient noise, a temperature change, proximity of the user of the apparatus, or a change in ambient light, the at least one computer-readable storage media device being integrated within the apparatus;
detect, via the sensor, sensor data;
determine, based on the sensor data, the distinct type of environmental variance detected;
responsive to a determination of the distinct type of environmental variance detected, cause at least one radar-emitting element to provide a radar field, the radar field configured based on the distinct type of sensor that detected the distinct type of environmental variance and the distinct type of environmental variance detected;
receive, via at least one radar-receiving element, a reflection signal caused by reflection of the radar field off a target within the radar field;
resolve the reflection signal into supplemental radar data;
extract, from the supplemental radar data, a radar feature of the target, the radar feature comprising at least one of a radar detection feature, a radar reflection feature, a radar motion feature, a radar position feature, or a radar shape feature of the target;
augment the sensor data with the radar feature to provide enhanced sensor data; and
expose the enhanced sensor data to a sensor-based application effective to improve performance of the sensor-based application.

16. The computer-readable storage media device of claim 15, wherein the sensor comprises an accelerometer, gyroscope, hall effect sensor, magnetometer, temperature sensor, microphone, capacitive sensor, proximity sensor, ambient light sensor, red-green-blue (RGB) image sensor, infrared sensor, or depth sensor.

17. The computer-readable storage media device of claim 15, wherein the instructions further cause the processing system to determine, based on the supplemental radar data, an indication of a number of targets, total reflected energy, moving energy, one-dimensional velocity, one-dimensional velocity dispersion, three-dimensional spatial coordinates, or one-dimensional spatial dispersion based on the reflection signal; and
the augmenting is based on the indication.

18. The computer-readable storage media device of claim 15, wherein:
the instructions further cause the processing system to perform, based on the distinct type of environmental variance detected, a range-Doppler transform, range profile transform, micro-Doppler transform, I/Q transform, or spectrogram transform on the reflection signal; and
the resolving is based on the performed transform.

19. The computer-readable storage media device of claim 15, wherein the sensor-based application comprises proximity detection, user detection, user tracking, activity detection, facial recognition, breathing detection, or motion signature identification.

20. The computer-readable storage media device of claim 15, wherein augmenting the sensor data with the radar feature is effective to enhance the sensor data by:
increasing a positional accuracy of the sensor data;
mitigating a false positive detection attributed to the sensor data; or
improving a classification precision of the sensor data.

* * * * *